United States Patent
Wu et al.

(10) Patent No.: US 9,350,231 B2
(45) Date of Patent: May 24, 2016

(54) METHOD FOR IMPROVING PERFORMANCE OF FILTER AND POWER CONVERSION APPARATUS

(71) Applicant: DELTA ELECTRONICS, INC., Taoyuan Hsien (TW)

(72) Inventors: Rui Wu, Taoyuan Hsien (TW); Yicong Xie, Taoyuan Hsien (TW); Min Zhou, Taoyuan Hsien (TW); Teng Liu, Taoyuan Hsien (TW)

(73) Assignee: DELTA ELECTRONICS, INC., Shanghai (CN)

( * ) Notice: Subject to any disclaimer, the term of this patent is extended or adjusted under 35 U.S.C. 154(b) by 775 days.

(21) Appl. No.: 13/627,732

(22) Filed: Sep. 26, 2012

(65) Prior Publication Data

US 2013/0308352 A1  Nov. 21, 2013

(30) Foreign Application Priority Data

May 18, 2012 (CN) .......................... 2012 1 0156306

(51) Int. Cl.
*H02M 1/12* (2006.01)
*H02M 1/44* (2007.01)
*H02M 1/14* (2006.01)
*H02M 3/158* (2006.01)
*H02M 3/335* (2006.01)
*H02M 1/00* (2006.01)

(52) U.S. Cl.
CPC ................ *H02M 1/44* (2013.01); *H02M 1/126* (2013.01); *H02M 1/14* (2013.01); *H02M 3/158* (2013.01); *H02M 3/33523* (2013.01); *H02M 2001/0064* (2013.01); *Y02B 70/1425* (2013.01); *Y02B 70/1433* (2013.01)

(58) Field of Classification Search
CPC ....... H02M 1/12; H02M 7/003; H02M 7/537; H02M 1/14; H02M 1/44; H02M 1/126; H02M 3/158; H02M 3/33523; H02M 2001/0064; H03H 7/09; H03H 7/0115; Y02B 70/1425; Y02B 70/1433
USPC ..................................... 363/39, 131; 333/177
See application file for complete search history.

(56) References Cited

U.S. PATENT DOCUMENTS

| 7,078,987 B1* | 7/2006 | Petrovic ........................ 333/177 |
| 7,589,605 B2* | 9/2009 | Perreault et al. .............. 333/177 |
| 2012/0114009 A1* | 5/2012 | Melvin et al. ................. 373/150 |

FOREIGN PATENT DOCUMENTS

| CN | 101335506 A | 12/2008 |
| TW | 200828797 A | 7/2008 |
| WO | WO-0127720 A2 | 4/2001 |

OTHER PUBLICATIONS

Office Action issued Apr. 1, 2015 by the CN Office.

* cited by examiner

*Primary Examiner* — Yemane Mehari
(74) *Attorney, Agent, or Firm* — Yunling Ren; Eaton & Van Winkle

(57) ABSTRACT

A power conversion apparatus is disclosed in the present application. The power conversion apparatus comprises: a power converter comprising an energy-storage magnetic component, and a filter comprising an inductor component and a two-port network connected the energy-storage magnetic component and the inductor component, wherein a series resonance is formed by the two-port network and a mutual inductance which is formed by a coupling between the energy-storage magnetic component and the inductor component.

25 Claims, 20 Drawing Sheets negative coupling positive coupling

METHOD FOR IMPROVING PERFORMANCE OF FILTER AND POWER CONVERSION APPARATUS

CROSS REFERENCE TO RELATED APPLICATIONS

The present application claims priority under 35 U.S.C. §119 to Chinese Patent Application No. 201210156306.7, filed on May 18, 2012, the entire content of which is incorporated herein by reference.

FIELD OF THE INVENTION

The present application relates to a method for improving performance of a filter and the power conversion apparatus thereof.

BACKGROUND OF THE INVENTION

Harmonic voltage and harmonic current generated by on-off actions of a switch component in a power converter may cause electromagnetic interference with an input of the power converter. Therefore, an EMI (Electromagnetic Interference) filter is generally needed to be provided between the power converter and the input in order to reduce the electromagnetic interference with the input.

As the power density of a power converter is increased, the volume of a power converter is reduced, and the distance between devices or between components is lessened, energy-storage magnetic components in the power converter, such as a transformer or an inductor component, may cause interference with an EMI filter, thereby the EMI filter cannot operate normally, or the performance and filtering effect of the EMI filter are reduced.

In the art, in order to reduce interference with an EMI filter from energy-storage magnetic components in a power converter, or in order to improve the performance and effect of the EMI filter, the usual practice is simply to increase the value of inductances or capacitances in the EMI filter and thus improve insertion loss (representing the EMI filter's filtering performance or suppressing capacity against EMI) of the EMI filter against EMI, to weaken the interference of the energy-storage magnetic components in the power converter. However, the following defects exist in the above method:
1. The volume and cost of an EMI filter may be increased.
2. The filtering for strong electromagnetic interference at specific frequencies can not be efficiently directed.

SUMMARY OF THE INVENTION

To solve at least one of the above-mentioned problems, the present application provides a power conversion apparatus, comprising: a power converter, comprising an energy-storage magnetic component; and a filter, comprising an inductor component and a two-port network connected between the energy-storage magnetic component and the inductor component, wherein a series resonance is formed by the two-port network and a mutual inductance which is formed by a coupling between the energy-storage magnetic component and the inductor component, and a resonant frequency of the series resonance is 85%~115% of a frequency at which insertion loss of the filter needs to be improved.

The present application further provides a method for improving a performance of a filter, comprising: providing an energy-storage magnetic component which is arranged in a power converter; providing the filter including an inductor component and a two-port network connected between the energy-storage magnetic component and the inductor component; determining a frequency at which insertion loss of the filter needs to be improved; and regulating a coupling manner between the energy-storage magnetic component and the inductor component such that a series resonance is formed by the two-port network and a mutual inductance formed by a coupling between the energy-storage magnetic component and the inductor component, and regulating a resonant frequency of the series resonance to 85%~115% of a frequency at which insertion loss of the filter needs to be improved.

According to the present application, the interference with the EMI filter from the energy-storage magnetic component in the power converter may be reduced, the performance and effect of the EMI filter may be enhanced, and the insertion loss of EMI filter against electromagnetic interference at specific frequencies may be further improved, thereby the increased volume and cost of the EMI filter can be avoidable.

BRIEF DESCRIPTION OF THE DRAWINGS

The embodiments of the present application will be described with reference to the accompanying drawings below, wherein.

DETAILED DESCRIPTION OF THE INVENTION

Hereinafter, the present application will be described in detail with reference to FIGS. 1A-12B. It should be noted that, in the accompanying drawings described hereinafter, when a cross point existing between line sections (as connecting wires) is a black point, the cross point represents a junction, and when a cross point existing between the line sections is not a black point, the cross point is not a junction but represents that the line sections are only across each other. Turns shown in each winding are illustrative and do not represent the real turns or turns ratio. Each sign of inductor, transformer winding and capacitor represents not only the component itself but also an algebra character of the capacity thereof. In the embodiments and claims, "a" and "the" indicate one or more, unless the context defines otherwise.

Figure 1A:
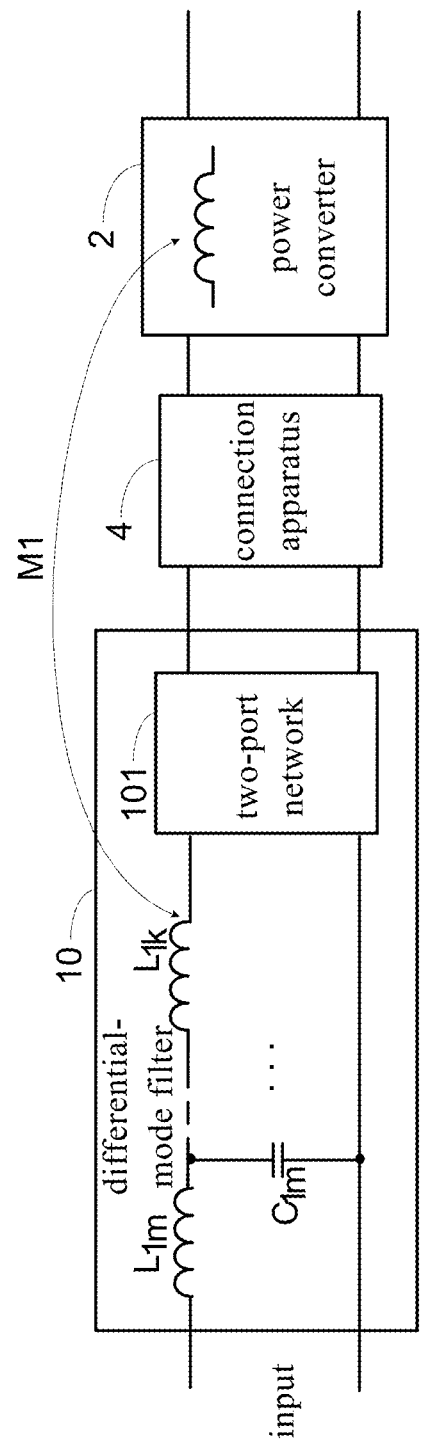
FIG. 1A is a circuit diagram exemplarily showing an embodiment of a power conversion apparatus comprising an EMI differential-mode filter and a power converter according to the present application.

FIG. 1A is a circuit diagram exemplarily showing an embodiment of a power conversion apparatus comprising an EMI differential-mode filter and a power converter according to the present application.

The power conversion apparatus shown in FIG. 1A includes a power converter 2 and an EMI differential-mode filter 10. The EMI differential-mode filter 10 is connected between an input and the power converter 2, and for example, may be a $(2 \times m)$-order EMI differential-mode filter, or a $(2 \times (m-1)+1)$-order EMI differential-mode filter, where m is an arbitrary integer and m>0, and k is an integer and 0<k≤m. In the electronic technology, the order of a filter represents the number of poles in the transfer function of a filter, and generally, for such an EMI differential-mode filter composed of inductors and capacitors, the order thereof is the total number of inductors and capacitors therein.

The power converter 2 in FIG. 1A includes an energy-storage magnetic component which may convert energy in the form of an inductor or a transformer. The power converter 2 may be a converter in any form, for example, an Alternate Current (AC)-Direct Current (DC) converter, a DC-DC converter, a DC-AC converter, an isolation converter, or a non-isolation converter.

The input in FIG. 1A may be a Direct Current input or may be an Alternate Current input.

In order to facilitate the description of a general example of the present application, for example, the EMI differential-mode filter 10 includes m two-order filters, that is, $L_{11}C_{11}$ two-order filter (not shown in FIG. 1A) ... $L_{1k}C_{1k}$ two-order filter (only the inductor component $L_{1k}$ thereof is shown) ... $L_{1m}C_{1m}$ two-order filter, and the m two-order filters cascade in sequence to form a $(2 \times m)$-order EMI differential-mode filter.

Specifically, as shown in FIG. 1A, in the $(2 \times m)$-order EMI differential-mode filter, a first filter, that is, a $L_{11}C_{11}$ two-order filter, is connected to the power converter 2, and other m−1 two-order filters, that is, $L_{12}C_{12}$ two-order filter ... $L_{1k}C_{1k}$ two-order filter ... $L_{1m}C_{1m}$ two-order filter, in sequence cascades from the beginning of the $L_{11}C_{11}$ two-order filter, in such a manner that an EMI filter capacitor in each of these two-order filters is connected in parallel and then an inductor component thereof follows in series the EMI filter capacitor, so as to form the $(2 \times m)$-order EMI differential-mode filter. In addition, in other embodiments, the arrangement of the EMI filter inductors and the EMI filter capacitors in each of $L_{11}C_{11}$ two-order filter . . . $L_{1k}C_{1k}$ two-order filter . . . $L_{1m}C_{1m}$ two-order filter, which form a (2×m)-order EMI differential-mode filter, may be different from each other. For example, when any of these two-order filters cascades, an EMI filter inductor thereof is connected in series and then an EMI filter capacitor thereof follows in parallel the EMI filter inductor. It should be noted that in the Figures, interrupt lines among EMI filter inductor $L_{11}$ . . . EMI filter inductor $L_{1k}$ . . . EMI filter inductor $L_{1m}$ represents omission of EMI filter inductor of other EMI two-order filter existing among them, even other capacitor and resistance, and so on.

As an embodiment of the present application, other connection apparatus 4, such as an impedance network in any form, and so on, may be provided between the EMI differential-mode filter 10 and the power converter 2.

Since any inductor and any transformer used in practical operation are not ideal, magnetic flux leakage and mutual inductance phenomena may arise between inductors or transformer windings. For example, a mutual inductance $M_1$ arises between the EMI filter inductor $L_{1k}$ of the $L_{1k}C_{1k}$ two-order filter in the above (2×m)-order EMI differential-mode filter 10 and the energy-storage magnetic component of the power converter 2, and thus an inductor or transformer in the energy-storage magnetic of the power converter 2 may influence the EMI differential-mode filter 10. If such influence is not controlled, the normal operation of the EMI differential-mode filter 10 would be affected, or the performance and effect of the EMI differential-mode filter 10 would be reduced. On the contrary, the present application positively utilizes such mutual inductance $M_1$ to improve the performance and effect of the EMI differential-mode filter 10.

In order to facilitate the description of the present application, a network comprising filter capacitors and filter inductors, which are located between the EMI filter inductor $L_{1k}$ of the $L_{1k}C_{1k}$ two-order filter in the (2×m)-order EMI differential-mode filter 10 and the energy-storage magnetic component of the power converter 2, is equivalent to a two-port network 101, that is, the two-port network 101 comprises the cascade of the $L_{11}C_{11}$ two-order filter . . . the $L_{1\ k-1}C_{1\ k-1}$ two-order filter and the EMI filter inductor $L_{1k}$.

Figure 2A:
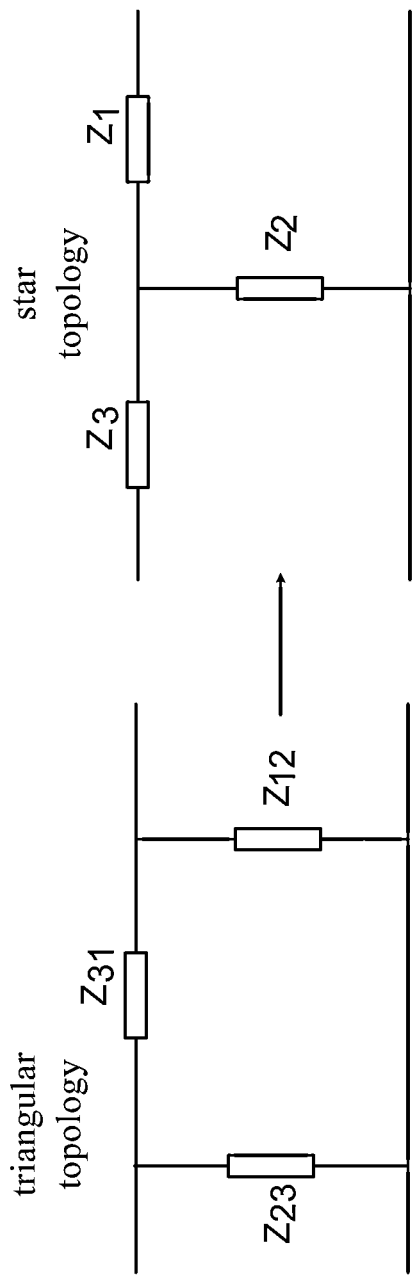
FIG. 2A is a principle diagram illustratively showing a triangular topology of a two-port network equivalent to a star topology of a two-port network.

FIG. 2A is a principle diagram illustratively showing a triangular topology of a two-port network equivalent to a star topology of a two-port network. A triangular topology of a two-port network comprising complex impedances $Z_{12}$, $Z_{23}$ and $Z_{31}$, is shown in the left diagram of FIG. 2A, which may be equivalent to a star topology of a two-port network comprising complex impedances $Z_1$, $Z_2$ and $Z_3$ as shown in the right diagram of FIG. 2A, wherein:

$$\begin{cases} Z_1 = \dfrac{Z_{31} \cdot Z_{12}}{Z_{12} + Z_{23} + Z_{31}} \\ Z_2 = \dfrac{Z_{12} \cdot Z_{23}}{Z_{12} + Z_{23} + Z_{31}} \\ Z_3 = \dfrac{Z_{23} \cdot Z_{31}}{Z_{12} + Z_{23} + Z_{31}} \end{cases}$$

Figure 2B:
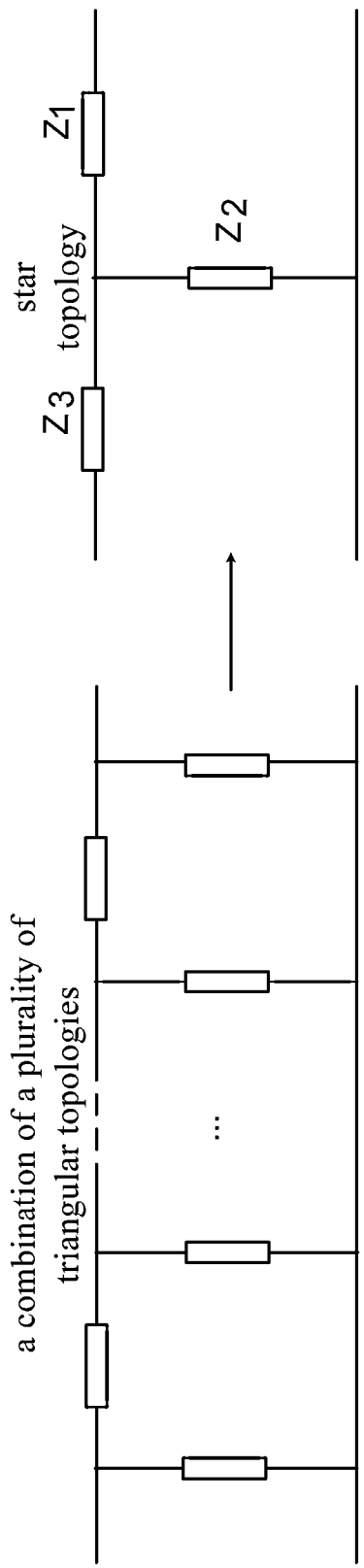
FIG. 2B is a principle diagram illustratively showing a two-port network which is formed of a plurality of triangular topologies, equivalent to a star topology of a two-port network.

FIG. 2B is a principle diagram illustratively showing a two-port network, which is formed of a plurality of triangular topologies, being equaled to a star topology of a two-port network. According to the basic principle as shown in FIG. 2A, a two-port network formed of a plurality of triangular topologies, shown in the left diagram of FIG. 2B, may be finally equaled to a star topology of a two-port network as shown in the right diagram of FIG. 2B, by a multiple conversion of triangular structure into star structure.

Figure 3:
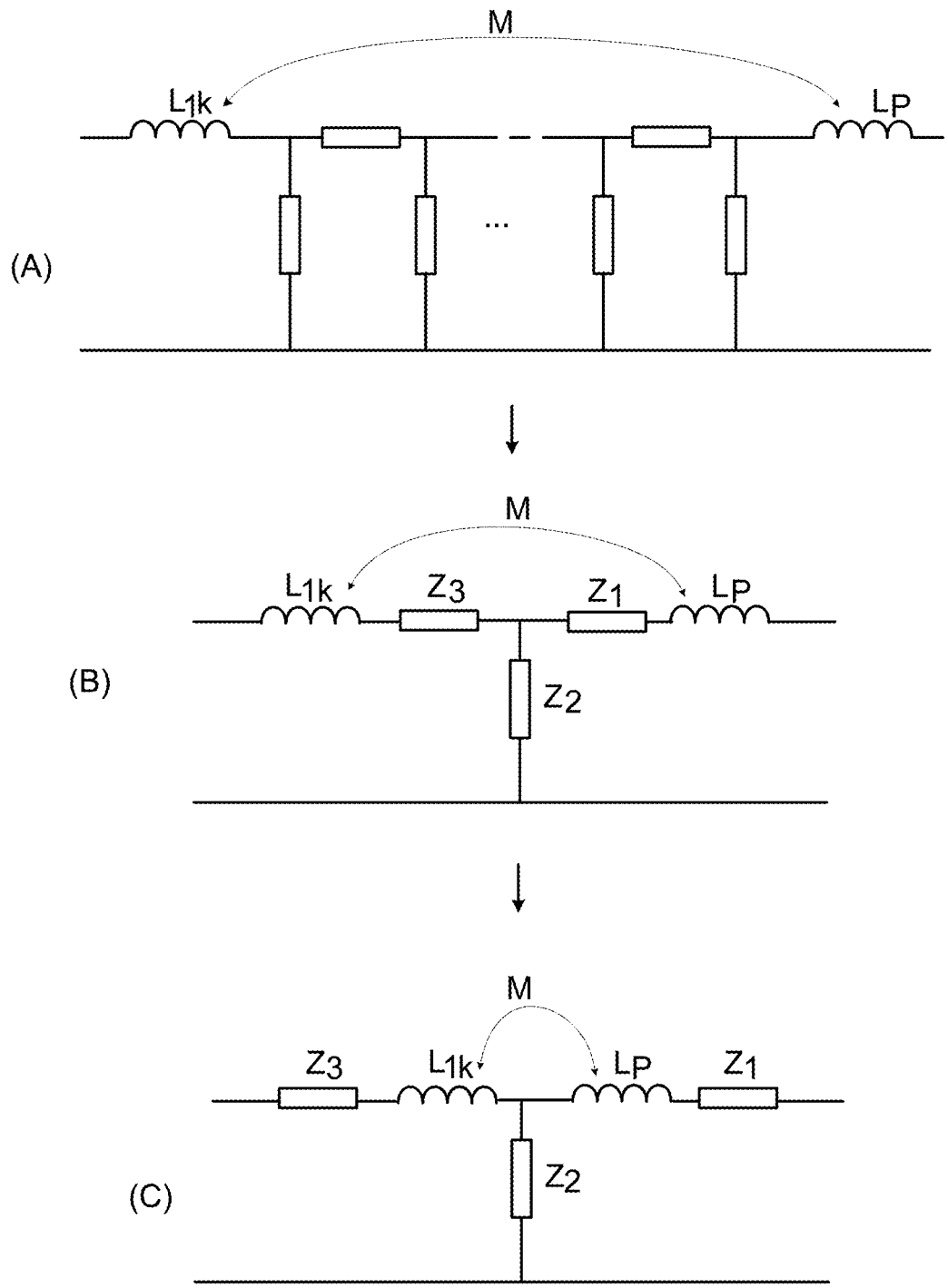
FIG. 3 is a principle diagram illustratively showing an equivalent star topology when a two-port network formed of a plurality of triangular topologies exists between two inductors.

FIG. 3 is a principle diagram illustratively showing an equivalent star topology when a two-port network formed of a plurality of triangular topologies exists between two inductors.

As shown in FIG. 3 (A), assuming that a two-port network formed of a plurality of triangular topologies exists between magnetic component $L_{1k}$ and magnetic component $L_P$ coupled to each other, the two-port network may be equaled to a star circuit topology as shown in FIG. 3 (B) by the above conversion of triangular topology into star topology. In order to facilitate the description, we assume that the equivalent star circuit topology comprises complex impedances $Z_1$, $Z_2$ and $Z_3$, as shown in FIG. 3 (B).

The star circuit topology as shown in FIG. 3 (B) may be further equaled to a star circuit topology as shown in FIG. 3 (C), where $Z_2$ is a complex impedance. In order to facilitate the description, $Z_2$ may be represented by the following equation:

$$Z_2 = A + jB,$$

wherein both of A and B are real number.

Assuming that a mutual inductance arising due to a magnetic coupling between magnetic component $L_{1k}$ and magnetic component $L_P$ is M, and the frequency of a EMI signal is $\omega$, the equivalent impedance $Z_2'$ decoupled from $Z_2$ branch may be represented as:

In case of a negative coupling:

$$Z_2' = A + j(B + \omega M),$$

or

In case of a positive coupling:

$$Z_2' = A + j(B - \omega M).$$

The present application will become easily understood according to the equivalent principle described with reference to FIGS. 2A-3. For example, the magnetic component $L_{1k}$ in FIG. 3 is the EMI filter inductor of the $L_{1k}C_{1k}$ two-order filter in the (2×m)-order EMI differential-mode filter 10 shown in FIG. 1A, the magnetic component $L_P$ in FIG. 3 is the inductor or transformer winding of the energy-storage magnetic component in the power converter 2 shown in FIG. 1A, the two-port network formed of a plurality of triangular topologies in FIG. 3 is the two-port network 101 shown in FIG. 1A, and the $Z_2$ branch in FIG. 3 is the equivalent parallel branch of the two-port network 101 shown in FIG. 1A.

An optimized method for improving the filtering performance of the EMI differential-mode filter 10 taken for example is to minimize the amplitude of $Z_2'$, that is, in case of a negative coupling:

$$(B + \omega M) = 0,$$

or in case of a positive coupling:

$$(B - \omega M) = 0.$$

Therefore, when the sign of B is positive (that is, when B is positive, $Z_2$ presents inductive character), the coupling manner between the magnetic component $L_{1k}$ and the magnetic component $L_P$ is regulated to a positive coupling, so as to satisfy the equation $(B - \omega M) = 0$. Meanwhile, a series resonance may arise in the equivalent parallel branch (i.e. the $Z_2$ branch) of the two-port network 101, that is, in the two-port network 101.

On the contrary, when the sign of B is negative (that is, when B is negative, $Z_2$ presents capacitive character), the coupling manner between the magnetic component $L_{1k}$ and the magnetic component $L_P$ is regulated to a negative coupling, so as to satisfy the equation (B+ωM)=0. Meanwhile, a series resonance may arise in the equivalent parallel branch (i.e. the $Z_2$ branch) of the two-port network 101, that is, in the two-port network 101.

In sum up, the coupling manner between the magnetic component $L_{1k}$ of the EMI differential-mode filter 10 and the inductor or transformer windings ($L_P$) of the energy-storage magnetic component in the power converter 2 may be regulated such that a series resonance is formed by the coupling inductor (i.e. mutual inductance) thereof and the two-port network 101, and a resonance frequency of the series resonance is regulated adjacent to a frequency point at which the filtering performance of the EMI differential-mode filter 10 needs to be improved. In this case, the filtering performance of the EMI differential-mode filter 10 may be improved.

In an embodiment, the coupling manner between the magnetic component $L_{1k}$ of the EMI differential-mode filter 10 and the inductor or transformer windings ($L_P$) of the energy-storage magnetic component in the power converter 2 may be regulated. When the sign of B is positive, the coupling manner is a positive coupling, and when the sign of B is negative, the coupling manner is a negative coupling, and the following equation is satisfied:

$$M = \frac{|B|}{\omega}$$

meanwhile, $$Z_2' = A$$

At this time, the impedance of $Z_2$ is minimized. As a result, the resonant frequency f of the series resonance is equal to a frequency point at which the filtering performance of the EMI differential-mode filter 10 needs to be improved. In practice, the ratio of the resonant frequency f to the frequency point f0 at which the filtering performance (that is, insertion loss) of the EMI differential-mode filter 10 needs to be improved, is appropriately 1, and may be 85%~115% (that is, in consideration of ±15% error).

Figure 6:
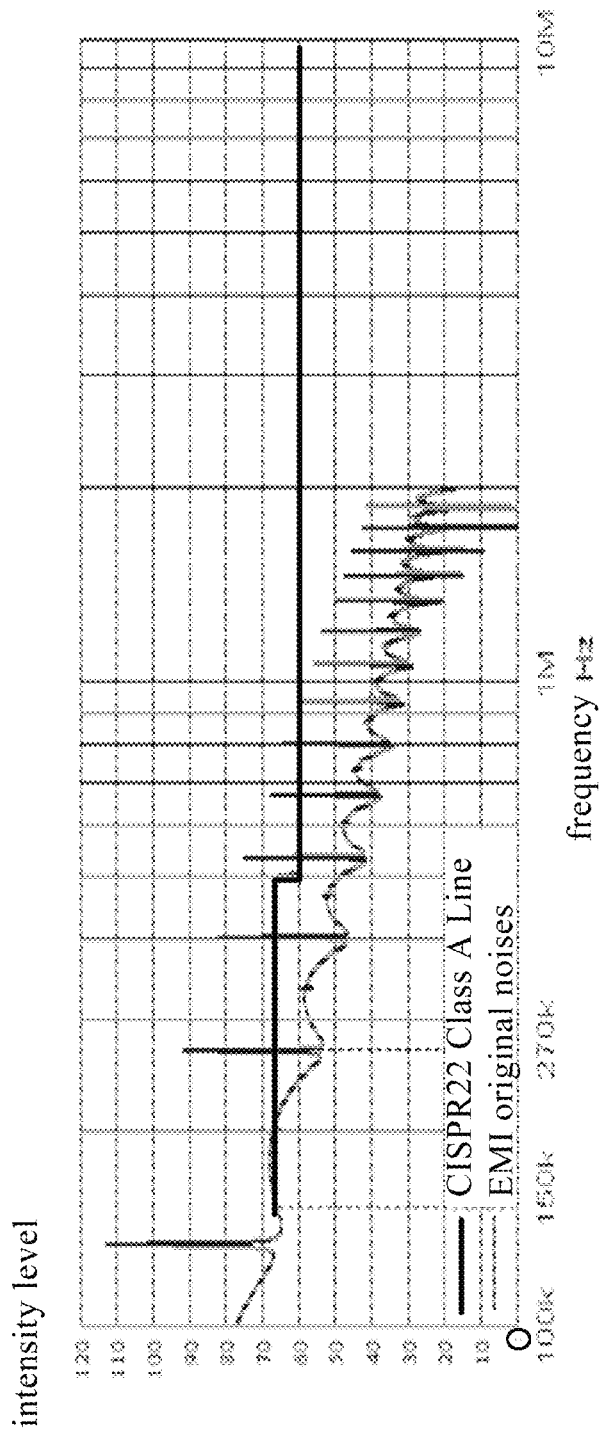
FIG. 6 is a diagram illustratively showing a standard line of CISPR22 Class A (International Special Committee on Radio Interference Class A) and original noises according to an embodiment of the present application.

Here, electromagnetic interference generated by a power converter is generally a harmonic of on-off frequency or an integral multiple of the on-off frequency of a switch component in the power converter, and the frequency at which insertion loss of an EMI differential-mode filter needs to be improved, may be determined by measuring the frequency distribution of original noises in the power converter and comparing the measured result with a limit value of the EMI standard. FIG. 6 is a diagram illustratively showing a standard line of CISPR22 Class A and original noises according to an embodiment of the present application, where the stepped curve indicated by a thicker solid line is the standard line of CISPR22 Class A measurement standard, and a corrugated curve indicated by a thinner solid line is a frequency distribution of EMI original noises in the power converter.

Taking the embodiment shown in FIG. 1A for example, the method for improving the performance of filters comprises the following steps of:

Firstly, determining the frequency f0 at which insertion loss of the EMI filter 10 needs to be improved. Taking for example the standard line in CISPR22 Class A measurement standard and the frequency distribution of EMI original noises in the power converter 2 shown in FIG. 6, the on-off frequency of a switch component in the power converter 2 is 135 kHz, the start frequency of the standard line in CISPR22 Class A measurement standard is 150 KHz, and at 270 KHz, the level of the EMI original noises is much more beyond the standard line in CISPR22 Class A measurement standard. Therefore, it is determined that the frequency f0 at which insertion loss of the EMI filter 10 needs to be improved, is 270 kHz, that is, a secondary harmonic of the on-off frequency of the switch component in the power converter 2. In other embodiments, the frequency f0 at which insertion loss of the EMI filter 10 needs to be improved, may be determined as needed or by other standards.

Then, regulating a coupling manner between the energy-storage magnetic component (such as an inductor or transformer) in the power converter 2 and the EMI filter inductor $L_{1k}$ in the EMI differential-mode filter 10 such that a series resonance is formed by the two-port network 101 and a mutual inductance formed between the energy-storage magnetic component in the power converter 2 and the EMI filter inductor (that is, mutual inductance $M_1$), and regulating the resonant frequency f so that the ratio of the resonant frequency f to a frequency f0 (for example, 270 KHz) at which insertion loss of the EMI differential-mode filter 10 needs to be improved, is appropriately 1, and may be 85%~115% (that is, in consideration of ±15% error). Therefore, the EMI differential-mode filter 10 may obtain more insertion loss in comparison with a conventional EMI differential-mode filter at the frequency f0, and the performance and effect of the EMI differential-mode filter 10 may be enhanced.

Although the present application has been described by an example of (2×m)-order EMI differential-mode filter 10, those skilled in the art should completely understand implement of a (2×(m−1)+1)-order EMI differential-mode filter.

The method for improving the performance of a filter and the power conversion apparatus according to the embodiment of FIG. 1A, may reduce interference with the EMI differential-mode filter from the energy-storage magnetic component in the power converter, enhance the performance and effect of the EMI differential-mode filter, and further improve insertion loss of the EMI differential-mode filter against differential-mode electromagnetic interference at specific frequencies, so as to avoid the increased volume and cost of the EMI differential-mode filter while improving insertion loss at specific frequencies.

Figure 1B:
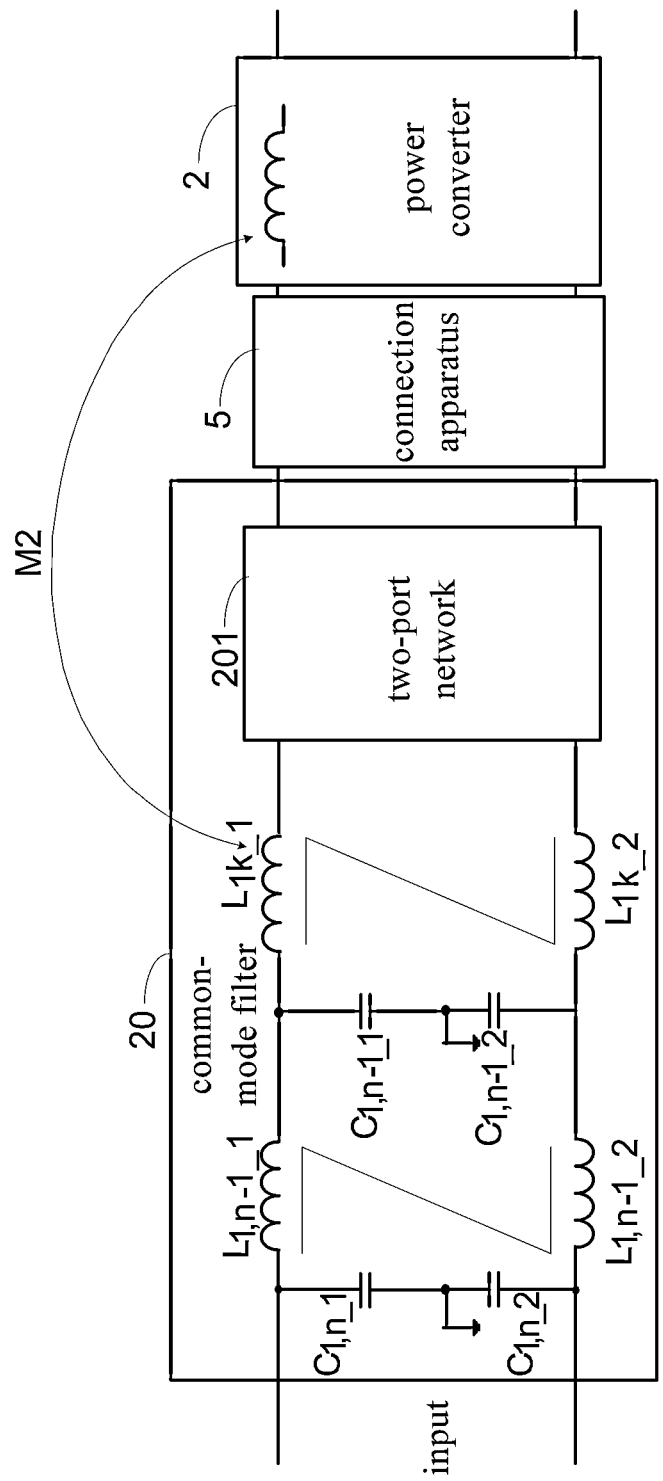
FIG. 1B is a circuit diagram exemplarily showing an embodiment of a power conversion apparatus comprising an EMI common-mode filter and a power converter according to the present application.

The present application is also adaptive for common-mode EMI signals. FIG. 1B is a circuit diagram exemplarily showing an embodiment of the power conversion apparatus comprising an EMI common-mode filter and a power converter according to the present application. The difference between FIG. 1B and FIG. 1A lies in that FIG. 1A directs EMI signals in form of differential-mode and FIG. 1B directs EMI signals in form of common-mode.

The power conversion apparatus in FIG. 1B comprises a power converter 2 and an EMI common-mode filter 20. The EMI common-mode filter 20 is connected between an input and the power converter 2, and for example, may be a (2×(n−1)+1)-order common-mode filter or (2×n)-order common-mode filter, wherein n is an arbitrary integer and n>0, and k is an integer and 0<k≤n.

The power converter 2 in FIG. 1B includes an energy-storage magnetic component for converting energy in the form of an inductor or a transformer. The power converter 2 may be a converter in any form, for example, an Alternate Current (AC)-Direct Current (DC) converter, a DC-DC converter, a DC-AC converter, an isolation converter, or a non-isolation converter.

The input in FIG. 1B may be a Direct Current input or may also be an Alternate Current input.

As an embodiment of the present application, other connection apparatus 4, such as an impedance network in any form, or the like, may be provided between the EMI common-mode filter 20 and the power converter 2.

Since any inductor and any transformer used in practical operation are not ideal, magnetic flux leakage and mutual inductance phenomena may arise between inductors or transformer windings. With reference to the processing of EMI signals in the form of differential-mode in FIG. 1A, those skilled in the art should completely understand the processing of EMI signals in the form of common-mode. For example, a mutual inductance $M_2$ arises between EMI common-mode filter inductors $L_{1\_k\_1}$ and $L_{1\_k\_2}$ in the $(2\times(n-1)+1)$-order EMI common-mode filter 20 and the energy-storage magnetic component in the power converter 2, and thus the inductor or the transformer of the energy-storage magnetic component in the power converter 2 may influence the EMI common-mode filter 20. If such influence is not controlled, the normal operation of the EMI common-mode filter 20 is affected, or the performance and effect of the EMI common-mode filter 20 are reduced. On the contrary, the present application positively utilizes such mutual inductance $M_2$ to improve the performance and effect of EMI common-mode filter 20.

Similar to the processing of an EMI differential-mode signal, in order to facilitate the description of the application, a network comprising filter capacitors and filter inductors, which are located between the EMI common-mode filter inductors $L_{1\_k\_1}$ and $L_{1\_k\_2}$ and the energy-storage magnetic component in the power converter 2, may be equaled to a two-port network 201.

A coupling manner between the energy-storage magnetic component (such as an inductor or transformer) in the power converter 2 and the inductor component (that is, EMI common-mode filter inductors $L_{1\_k\_1}$ and $L_{1\_k\_2}$) in the EMI common-mode filter 20 is regulated such that a series resonance is formed by the two-port network 201 and a mutual inductance formed between the energy-storage magnetic component and the EMI common-mode filter inductor (that is, mutual inductance $M_2$), and the resonant frequency f is regulated such that the ratio of the resonant frequency f to the frequency f0 at which insertion loss of the EMI common-mode filter 20 needs to be improved, is appropriately 1, and may be 85%~115% in practice (that is, in consideration of ±15% error). Therefore, the EMI common-mode filter 20 may obtain more insertion loss in comparison with a conventional EMI common-mode filter at the frequency f0, and the performance and effect of the EMI common-mode filter 20 may be enhanced.

Although the present application has been described by an example of the $(2\times(n-1)+1)$-order EMI common-mode filter in FIG. 1B, those skilled in the art should completely understand an implement of a $(2\times n)$-order EMI common-mode filter.

The method for improving the performance of common-mode filter and the power conversion apparatus according to the embodiment of FIG. 1B, may reduce interference with the EMI common-mode filter from the energy-storage magnetic component in the power converter, enhance the performance and effect of the EMI common-mode filter, and further improve insertion loss of EMI common-mode filter against common-mode electromagnetic interference at specific frequencies, so as to avoid the increased volume and cost of EMI common-mode filter while improving the insertion loss at specific frequencies.

Figure 4A:
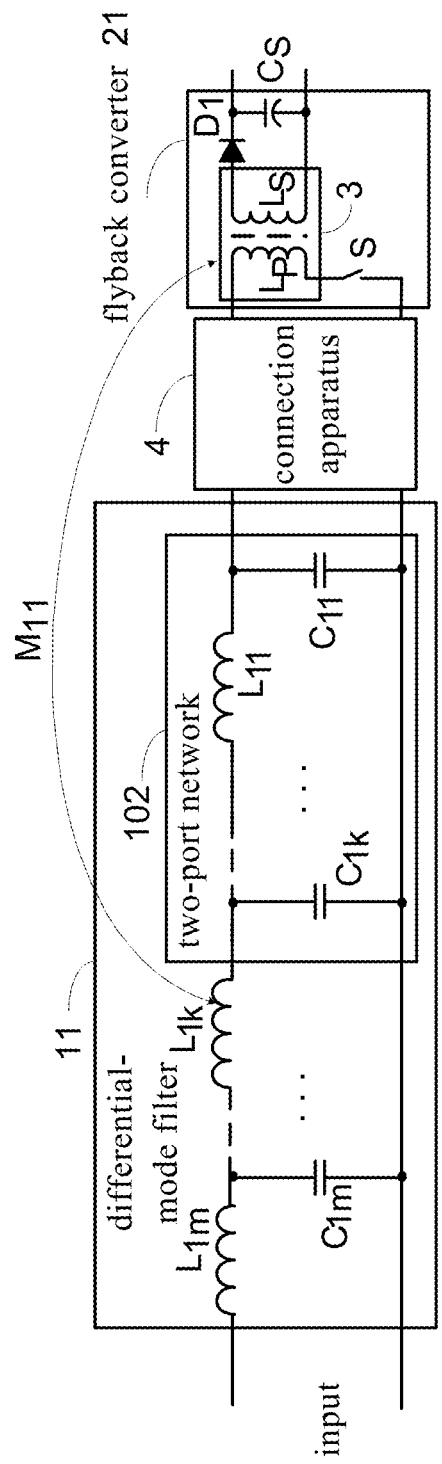
FIG. 4A is a circuit diagram illustratively showing an embodiment of a power conversion apparatus comprising a (2×m)-order EMI differential-mode filter and a flyback converter according to the present application.

FIG. 4A is a circuit diagram illustratively showing an embodiment of a power conversion apparatus comprising a $(2\times m)$-order EMI differential-mode filter and a flyback converter, wherein m is an integer and m>0, and k is an integer and $0 < k \leq m$.

The power conversion apparatus in FIG. 4A includes an EMI differential-mode filter 11. Further, in comparison with FIG. 1A, the power converter in the power conversion apparatus in FIG. 4A is implemented as a flyback converter 21. The EMI differential-mode filter 11 is connected between an input and the flyback converter 21.

The flyback converter 21 in FIG. 4A includes a transformer 3, a switch component S, a rectifier diode $D_1$ and a filter capacitor $C_S$, wherein the transformer 3 includes a primary winding $L_P$ connected in series with the switch component S and a secondary winding $L_S$ connected in parallel with the filter capacitor $C_S$ via the rectifier diode $D_1$.

When the switch component S is controlled to be on and off by a control signal with a certain frequency and duty ratio (not shown), a pulse current may be generated in the primary winding $L_P$ of the transformer 3. Thus, alternate voltage and alternate current are induced in the secondary winding $L_S$ of the transformer 3, which are rectified by the rectifier diode $D_1$ and filtered by the filter capacitor $C_S$ so that relatively smooth desired DC voltage and current is output at the ends of the filter capacitor $C_S$.

As shown in FIG. 4A, for example, the EMI differential-mode filter 11 includes m two-order filters, that is, $L_{11}C_{11}$ two-order filter ... $L_{1k}C_{1k}$ two-order filter ... $L_{1m}C_{1m}$ two-order filter, and the m two-order filters cascade in sequence to form a $(2\times m)$-order EMI differential-mode filter.

Specifically, as shown in FIG. 4A, the $(2\times m)$-order EMI differential-mode filter, via its first filter, that is, the $L_{11}C_{11}$ two-order filter, is connected to the flyback converter 21, wherein the EMI filter capacitor $C_{11}$ of the $L_{11}C_{11}$ two-order filter is connected in parallel with the primary winding $L_P$ of the transformer 3 via the switch component S, and the EMI filter inductor $L_{11}$ of the $L_{11}C_{11}$ two-order filter is connected in series with the primary winding $L_P$ of the transformer 3. The EMI filter capacitor $C_{11}$ is located between the EMI filter inductor $L_{11}$ and the primary winding $L_P$ of the transformer 3, that is, one end of the EMI filter capacitor $C_{11}$ is connected to a common point formed by one end of the EMI filter inductor $L_{11}$ and one end of the primary winding $L_P$ of the transformer 3. EMI filter inductors and EMI filter capacitors of the other m−1 two-order filters, that is, $L_{12}C_{12}$ two-order filter ... $L_{1k}C_{1k}$ two-order filter ... $L_{1m}C_{1m}$ two-order filter, in sequence cascade from the beginning of $L_{11}C_{11}$ two-order filter in the same manner as the arrangement of the EMI filter capacitor $C_{11}$ and the EMI filter inductor $L_{11}$ (that is, an EMI filter capacitor in each of these two-order filters is connected in parallel and then an inductor component thereof follows in series the EMI filter capacitor), so as to form the $(2\times m)$-order EMI differential-mode filter, as shown in FIG. 4A.

As an embodiment of the present application, other connection apparatus 4, for example, an impedance network in any form, may be arranged between the EMI differential-mode filter 11 and the power converter 2.

Since any inductor and any transformer used in practical operation are not ideal, magnetic flux leakage and mutual inductance phenomena may arise between inductors or transformer windings. For example, a mutual inductance $M_{11}$ arises between the EMI filter inductor $L_{1k}$ of the $L_{1k}C_{1k}$ two-order filter in the $(2\times m)$-order EMI differential-mode filter 11 and the primary winding $L_P$ of the transformer 3 in the flyback converter 21, and thus the primary winding $L_P$ of the transformer 3 in the flyback converter 21 may influence the EMI differential-mode filter 11. If such influence is not controlled, the normal operation of the EMI differential-mode filter 11 is affected, or the performance and effect of the EMI differential-mode filter 11 are reduced. On the contrary, the present application positively utilizes such mutual inductance $M_{11}$ to improve the performance and effect of the EMI differential-mode filter 11.

Similar to FIG. 1A, in order to facilitate the description of the present application, a network comprising filter capacitors and filter inductors, which are located between the EMI filter inductors $L_{1k}$ of the $L_{1k}C_{1k}$ two-order filter in the (2×m)-order EMI differential-mode filter 11 and the primary winding $L_P$ of the transformer 3 in the flyback converter 21, may be equaled to a two-port network 102.

The coupling manner between the primary winding $L_P$ of the transformer 3 in the flyback converter 21 and the inductor component (that is, EMI filter inductors $L_{1k}$) in the EMI differential-mode filter 11 is regulated such that a series resonance is formed by the two-port network 102 and a mutual inductance formed between the EMI filter inductors $L_{1k}$ and the primary winding $L_P$ of the transformer 3 (that is, mutual inductance $M_{11}$), and the resonant frequency f is regulated so that the ratio of the resonant frequency f to the frequency f0 at which insertion loss of the EMI differential-mode filter 11 needs to be improved, is appropriately 1, and may be 85%~115% in practice (that is, in consideration of ±15% error). Therefore, the EMI differential-mode filter 11 may obtain more insertion loss in comparison with a conventional EMI differential-mode filter at the frequency f0, and the performance and effect of the EMI differential-mode filter 11 may be enhanced.

Although the present application has been described by an example of the (2×m)-order EMI differential-mode filter 11 in FIG. 4A, those skilled in the art should completely understand an implement of a (2×(m−1)+1)-order EMI differential-mode filter.

According to the embodiment of FIG. 4A, the interference with the EMI differential-mode filter from the energy-storage magnetic component in the power converter may be reduced, the performance and effect of the EMI differential-mode filter may be enhanced, and the insertion loss of the EMI differential-mode filter against differential-mode electromagnetic interference at specific frequencies may be further improved, thereby the increased volume and cost of the EMI differential-mode filter can be avoidable.

Figure 4B:
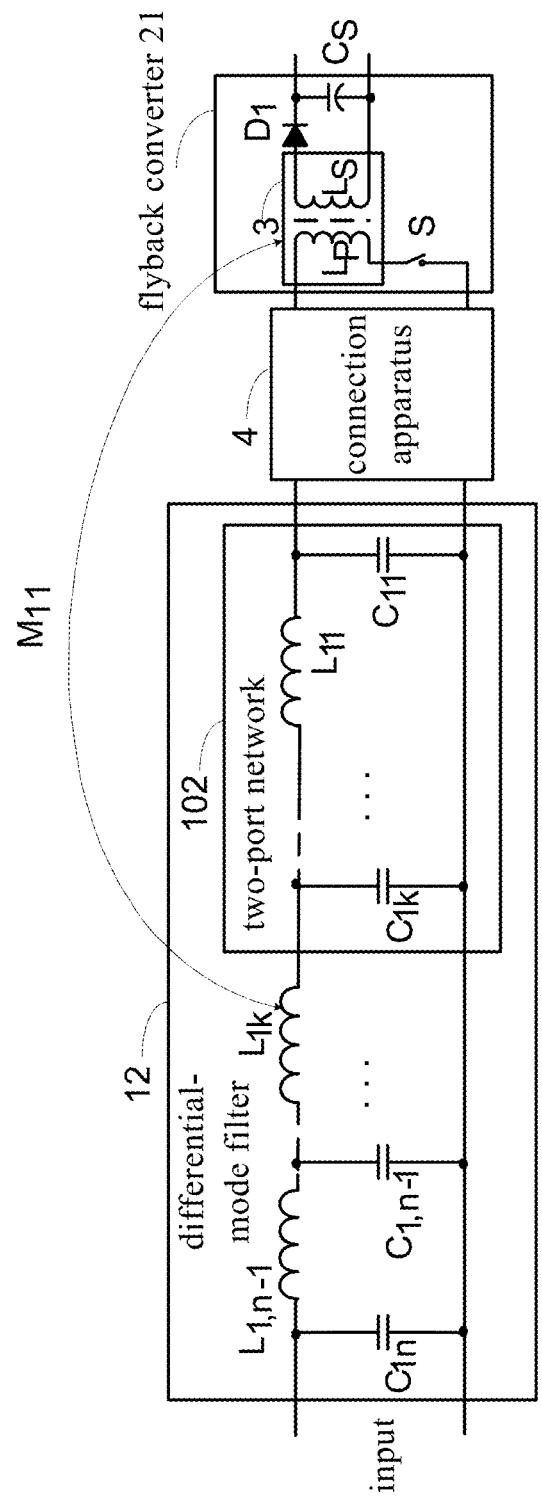
FIG. 4B is a circuit diagram illustratively showing an example of a power conversion apparatus comprising a (2×(n−1)+1)-order EMI differential-mode filter and a flyback converter according to the present application.

FIG. 4B is a circuit diagram illustratively showing an example of a power conversion apparatus comprising a (2×(n−1)+1)-order EMI differential-mode filter and a flyback converter according to the present application, where n is an integer and n>1, and k is an integer and 0<k<n. Since m and n are not specific numbers, the difference between FIG. 4A and FIG. 4B lies in that the EMI differential-mode filter 12 in FIG. 4B further cascades a single capacitor filter $C_{1n}$, at the end thereof far away from the power converter (for example, a flyback converter 21) to further enhance the performance of the EMI differential-mode filter 12. The (2×(n−1))-order EMI differential-mode filter formed of $L_{11}C_{11}$ two-order filter ... $L_{1k}C_{1k}$ two-order filter ... $L_{1,n-1}C_{1,n-1}$ two-order filter plays the same role as that of the (2×m)-order EMI differential-mode filter in FIG. 4A. For example, a mutual inductance $M_{11}$ arises between the EMI filter inductors $L_{1k}$ of the $L_{1k}C_{1k}$ two-order filter in the (2×(n−1))-order EMI differential-mode filter 12 and the primary winding $L_P$ of the transformer 3 in the flyback converter 21. Referring to the above description of FIGS. 1A to 4A, the embodiment shown in FIG. 4B should be easily understood.

Figure 4C:
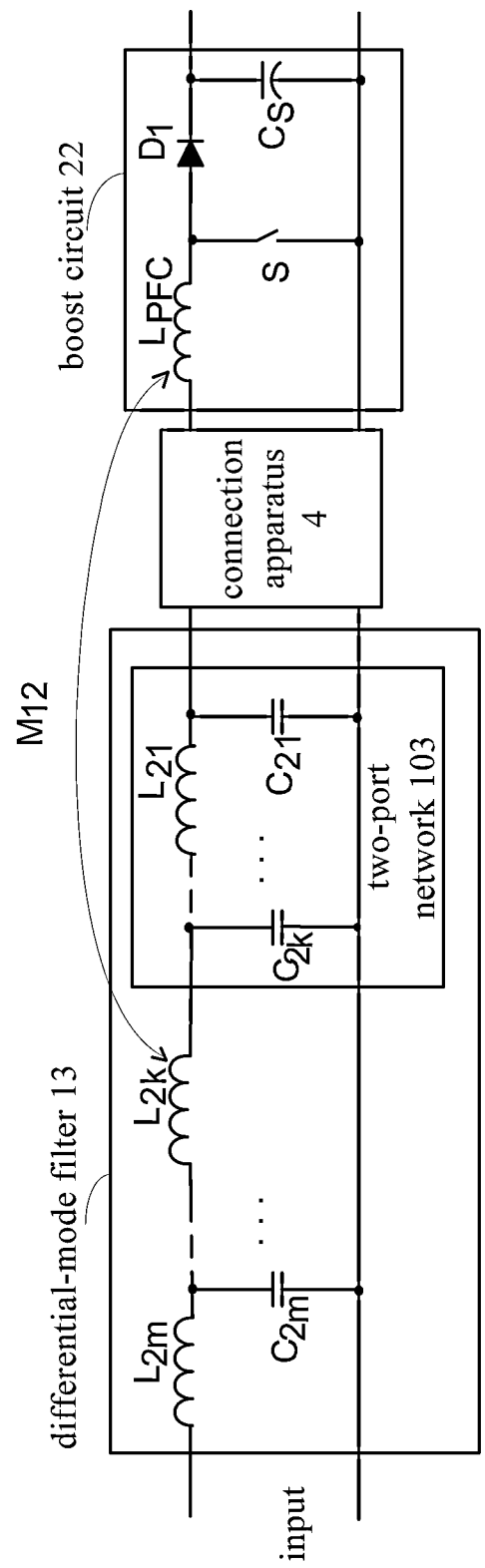
FIG. 4C is a circuit diagram illustratively showing an example of a power conversion apparatus comprising a (2×m)-order EMI differential-mode filter and a boost circuit (a kind of switching power converter) according to the present application.

FIG. 4C is a circuit diagram illustratively showing an example of a power conversion apparatus comprising a (2×m)-order EMI differential-mode filter and a boost circuit according to the present application. The difference between FIG. 4C and FIG. 4A lies in that the power converter in FIG. 4C utilizes a boost circuit 22 instead of the flyback converter 21 in FIG. 4A. For example, a mutual inductance $M_{12}$ arises between the inductor component (that is, the EMI filter inductors $L_{2k}$ of the $L_{2k}C_{2k}$ two-order filter) in the (2×m)-order EMI differential-mode filter 13 and the power factor correction inductor $L_{PFC}$ of the boost circuit 22. Referring to the above description of FIGS. 1A to 4B, the embodiment shown in FIG. 4C should be easily understood.

Figure 4D:
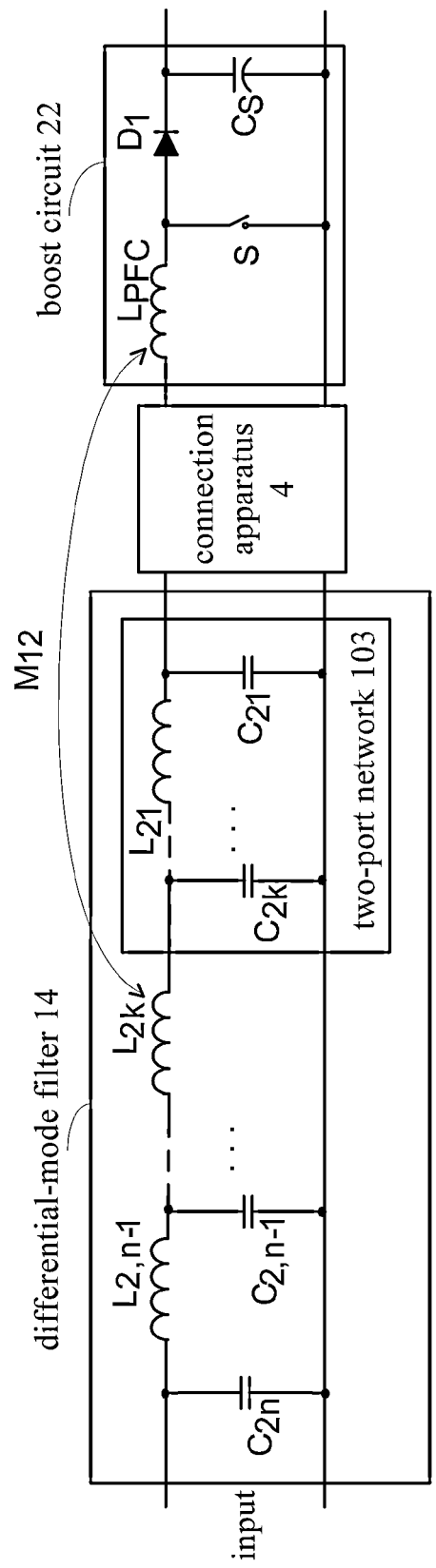
FIG. 4D is a circuit diagram illustratively showing an example of a power conversion apparatus comprising a (2×(n−1)+1)-order EMI differential-mode filter and a boost circuit according to the present application.

FIG. 4D is a circuit diagram illustratively showing an example of a power conversion apparatus comprising a (2×(n−1)+1)-order EMI differential-mode filter and a boost circuit according to the present application. The difference between FIG. 4D and FIG. 4B lies in that the power converter in FIG. 4D utilizes a boost circuit 22 instead of the flyback converter 21 in FIG. 4B. For example, a mutual inductance $M_{14}$ arises between the EMI filter inductors $L_{2k}$ of the $L_{2k}C_{2k}$ two-order filter in the (2×(n−1)+1)-order EMI differential-mode filter 14 and the power factor correction inductor $L_{PFC}$ of the boost circuit 22. Referring to the above description of FIGS. 1A to 4C, the embodiment shown in FIG. 4D should be easily understood.

Figure 5A:
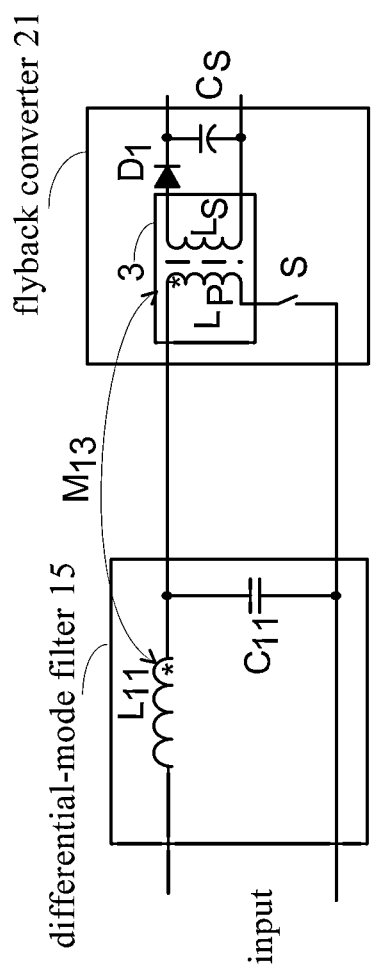
FIG. 5A is a circuit diagram illustratively showing an example of a power conversion apparatus comprising a two-order EMI differential-mode filter and a flyback converter according to the present application.

FIG. 5A is a circuit diagram illustratively showing an example of a power conversion apparatus comprising a two-order EMI differential-mode filter and a flyback converter according to the present application. FIG. 5A is a simplified diagram of FIG. 4A and FIG. 4B, for the purpose of more easily understanding the present application.

In order to more easily illustrate the present application, the EMI differential-mode filter 15 in FIG. 5A only comprises a $L_{11}C_{11}$ two-order filter, and the EMI filter capacitor $C_{11}$ of the EMI differential-mode filter 15 is connected between the EMI filter inductor $L_{11}$ of the EMI differential-mode filter 15 and the primary winding $L_P$ of the transformer 3. The EMI filter capacitor $C_{11}$ of the EMI differential-mode filter 15 in FIG. 5A may be regarded as a minimum scale of two-port network, which only comprises a capacitor. According to the description of FIG. 1A to FIG. 4D, a coupling manner between the energy-storage magnetic component in the flyback converter (that is, the primary winding $L_P$ of the transformer 3) and the EMI filter inductor $L_{11}$ of the EMI differential-mode filter 15 should be set to a negative coupling, that is, the end of the primary winding $L_P$ of the transformer 3 and the end of the EMI filter inductor $L_{11}$ of the EMI differential-mode filter 15, which are connected to each other, are homonymous ends, as indicated by asterisks in FIG. 5A. For example, a value of the mutual inductance between the EMI filter inductors $L_{11}$ of the EMI differential-mode filter 15 and the primary winding $L_P$ of the transformer 3 is $M_{13}$.

Figure 5B:
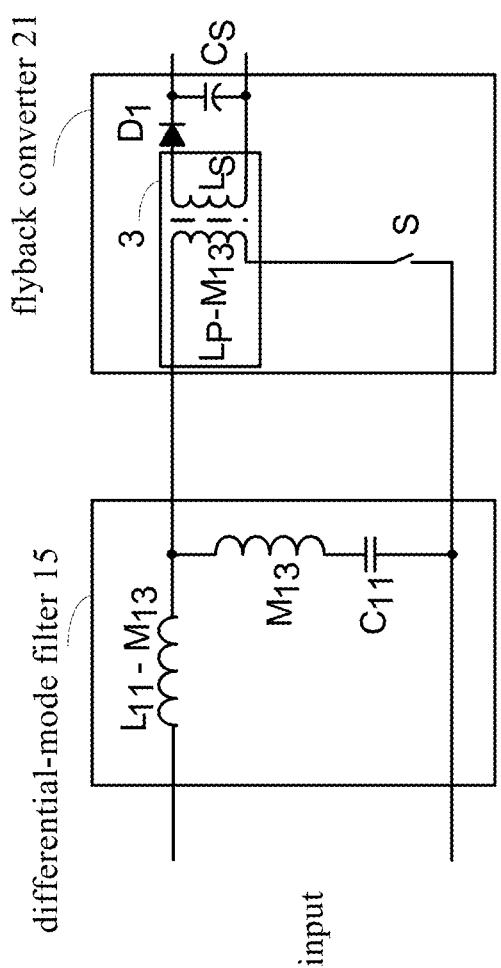
FIG. 5B is an equivalent circuit diagram of FIG. 5A when the mutual inductance between the EMI filter inductor $L_{11}$ in the EMI differential-mode filter 15 and the primary winding $L_P$ of the transformer 3 in the flyback converter 21 in FIG. 5A is decoupled.

FIG. 5B is an equivalent circuit diagram of FIG. 5A when the mutual inductance between the EMI filter inductor $L_{11}$ of the EMI differential-mode filter 15 and the primary winding $L_P$ of the transformer 3 in the flyback converter 21 in FIG. 5A is decoupled. As shown in FIG. 5B, since the coupling manner between the primary winding $L_P$ of the transformer 3 and the EMI filter inductor $L_{11}$ of the EMI differential-mode filter 15 is set to a negative coupling, the equivalent inductance value of the EMI filter inductor in the EMI differential-mode filter 15 after being decoupled is equaled to $(L_{11}-M_{13})$, and the equivalent inductance value of the primary winding $L_P$ of the transformer 3 in the flyback converter 21 after being decoupled is equaled to $(L_P-M_{13})$. Here, a value of mutual inductance between two magnetic components is usually less than 3% of any of the two magnetic components. Thus, the inductance $M_{13}$ in the equation $(L_{11}-M_{13})$ and $(L_P-M_{13})$, as compared with the inductance values of $L_{11}$ and $L_P$, may be ignored, and thus does not influence normal operation of the $L_{11}$ and the L. Moreover, an equivalent inductor $M_{13}$ is obtained at the EMI filter capacitor $C_{11}$ branch, a series resonance is formed by the equivalent inductor $M_{13}$ and the EMI filter capacitor $C_{11}$, and the resonant frequency f of which is:

$$f = \frac{1}{2\pi\sqrt{M_{13} \cdot C_{11}}}$$

The resonant frequency f may be regulated such that the ratio of the resonant frequency f to a frequency f0 at which insertion loss of the EMI differential-mode filter 15 needs to be improved, is appropriately 1, and may be 85%~115% (that is, in consideration of ±15% error). Therefore, the EMI differential-mode filter 15 may obtain more insertion loss in comparison with a conventional EMI differential-mode filter at the frequency f0, and the performance and effect of the EMI differential-mode filter 15 may be enhanced.

Figure 7A:
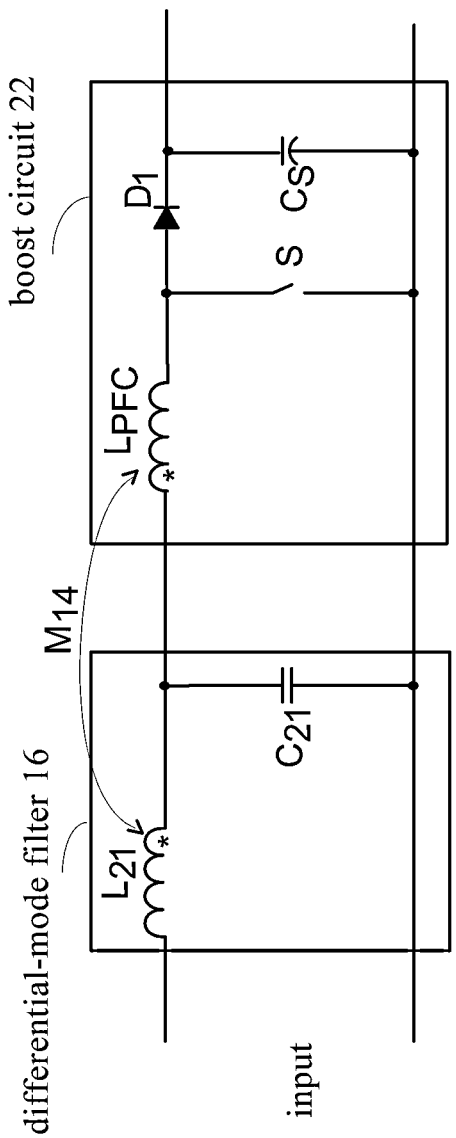
FIG. 7A is a circuit diagram illustratively showing an example of a power conversion apparatus comprising a two-order EMI differential-mode filter and a boost circuit according to the present application.

FIG. 7A is a circuit diagram illustratively showing an example of the power conversion apparatus comprising a two-order EMI differential-mode filter and a boost circuit according to the present application. The difference between FIG. 7A and FIG. 5A lies in that the power converter in FIG. 7A utilizes a boost circuit 22 instead of the flyback converter 21 in FIG. 5A.

In order to more easily illustrate the present application, the EMI differential-mode filter 16 in FIG. 7A only comprises a $L_{21}C_{21}$ two-order filter, and the EMI filter capacitor $C_{21}$ of the EMI differential-mode filter 16 is connected between the EMI filter inductor $L_{21}$ of the EMI differential-mode filter 16 and the energy-storage magnetic component (that is, a power factor correction inductor $L_{PFC}$) in the boost circuit 22. The EMI filter capacitor $C_{21}$ of the EMI differential-mode filter 16 in FIG. 7A may be regarded as a minimum scale of two-port network, which only comprises a capacitor. According to the description of FIG. 1A to FIG. 5B, a coupling manner between the power factor correction inductor $L_{PFC}$ of the boost circuit 22 and the EMI filter inductor $L_{21}$ of the EMI differential-mode filter 16 should be set to a negative coupling, that is, the end of the power factor correction inductor $L_{PFC}$ of the boost circuit 22 and the end of the EMI filter inductor $L_{21}$ of the EMI differential-mode filter 16, which are connected to each other, are homonymous ends, as indicated by asterisks in FIG. 7A. For example, a value of the mutual inductance between the EMI filter inductors $L_{21}$ of the EMI differential-mode filter 16 and the power factor correction inductor $L_{PFC}$ of the boost circuit 22 is $M_{14}$.

Figure 7B:
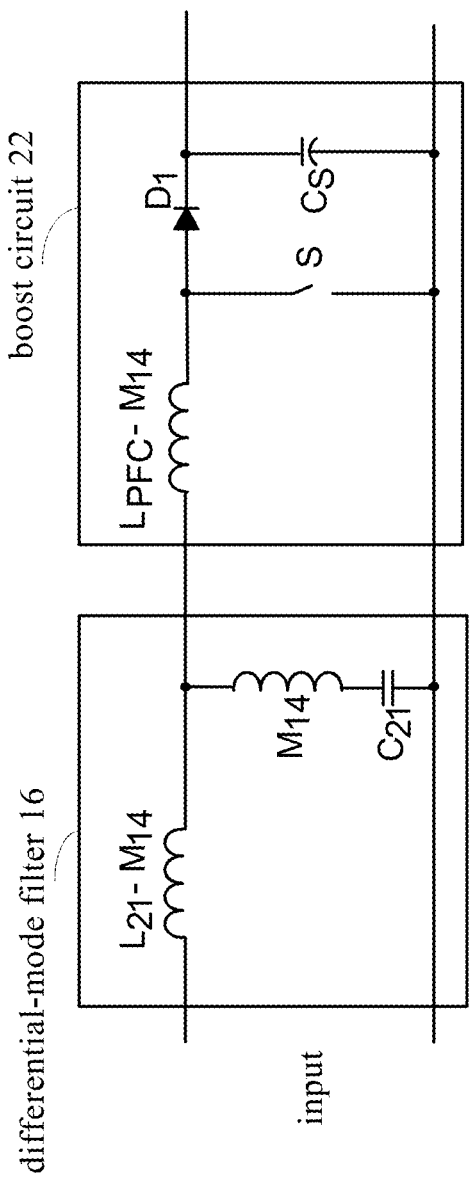
FIG. 7B is an equivalent circuit diagram of FIG. 7A when the mutual inductance between the EMI filter inductor $L_{21}$ in the EMI differential-mode filter 16 and the power factor correction inductor $L_{PFC}$ in the boost circuit 22 in FIG. 7A is decoupled.

FIG. 7B is an equivalent circuit diagram of FIG. 7A when the mutual inductance between the EMI filter inductor $L_{21}$ of the EMI differential-mode filter 16 and the power factor correction inductor $L_{PFC}$ of the boost circuit 22 in FIG. 7A is decoupled. As shown in FIG. 7B, since the coupling manner between the power factor correction inductor $L_{PFC}$ of the boost circuit 22 and the EMI filter inductor $L_{21}$ of the EMI differential-mode filter 16 is a negative coupling, the equivalent inductance value of the EMI filter inductor of the EMI differential-mode filter 16 after being decoupled is equaled to $L_{21}-M_{14}$ and the equivalent inductance value of the power factor correction inductor of the boost circuit 22 after being decoupled is equaled to $L_{PFC}-M_{14}$. Here, a value of mutual inductance between two magnetic components is usually less than 3% of any of the two magnetic components. Thus, the inductance $M_{14}$ in the equation ($L_{21}-M_{14}$) and ($L_{PFC}-M_{14}$), as compared with the inductance values of $L_{21}$ and $L_{PFC}$, may be ignored. Moreover, an equivalent inductor $M_{14}$ is obtained at the EMI filter capacitor $C_{21}$ branch, and a series resonance is formed by the equivalent inductor $M_{14}$ and the EMI filter capacitor $C_{21}$, and the resonant frequency f of which is:

$$f = \frac{1}{2\pi\sqrt{M_{14} \cdot C_{21}}}$$

The resonant frequency f may be regulated so that the ratio of resonant frequency f to the frequency f0 at which insertion loss of the EMI differential-mode filter 16 needs to be improved, is appropriately 1, and may be 85%~115% (that is, in consideration of ±15% error). Therefore, the EMI differential-mode filter 16 may obtain more insertion loss in comparison with a conventional EMI differential-mode filter at the frequency f0, and the performance and effect of the EMI differential-mode filter 16 may be enhanced.

The resonant frequency f of the equivalent series resonance at the two-port networks of the EMI filters shown in FIG. 1A, FIG. 4, FIG. 5B and FIG. 7B may be generalized as follows:

$$f = \frac{B}{2\pi M}$$

Here, B is an imaginary part value of impedance $Z_2$ of a parallel branch equivalent to the two-port network in FIG. 3(c). M is a mutual inductance value between an energy-storage magnetic component in a power converter and an inductor component in a filter.

When the sign of B is negative, the coupling manner between the energy-storage magnetic component in the power converter and the inductor component in the filter is regulated to a negative coupling.

When the sign of B is positive, the coupling manner between the energy-storage magnetic component in the power converter and the inductor component in the filter is regulated to a positive coupling.

Since a multi-order two-port network at least comprises a capacitor, an imaginary part value (i.e. B) of the impedance of a parallel branch equivalent to a two-port network can be regulated by regulating the capacitance of the capacitor, so as to achieve the regulation of the resonant frequency. As for a two-port network further comprising at least an inductor, an imaginary part value (i.e. B) of the impedance of a parallel branch equivalent to a two-port network can also be regulated by regulating the inductance of the inductor, so as to achieve the regulation of the resonant frequency. Alternately, an imaginary part value (i.e. B) of the impedance of a parallel branch equivalent to a two-port network can be regulated by regulating both the capacitance of a capacitor and the inductance of an inductor, so as to achieve the regulation of the resonant frequency.

Hereinafter, a two-port network in a filter, that is, a capacitor branch, is taken for example to illustrate regulation manner of a resonant frequency of a series resonance arising at the two-port network, and the resonant frequency f of the series resonance as the above described is expressed as follows:

$$f = \frac{B}{2\pi M} = \frac{\frac{1}{2\pi fC}}{2\pi M} = \frac{1}{4\pi^2 fMC} \Rightarrow f = \frac{1}{2\pi\sqrt{M \cdot C}}$$

Here, M is a value of mutual inductance between an energy-storage magnetic component in a power converter (such as a flyback converter or a boost circuit) and an inductor component (that is, EMI filter inductor) in an EMI differential-mode filter, and C is a capacitance of an EMI filter capacitor at the corresponding EMI filter capacitor branch (that is, a minimum scale of two-port network, which only comprises a capacitor) in an EMI differential-mode filter. The resonant frequency f may be regulated by regulating C or M such that the ratio of the resonant frequency f to a frequency f0 at which insertion loss of the EMI differential-mode filter needs to be improved, is appropriately 1, and may be 85%~115% (that is, in consideration of ±15% error). Therefore, the EMI differential-mode filter may obtain more insertion loss in comparison with the conventional EMI differential-mode filter at the frequency f0, and the performance and effect of the EMI differential-mode filter may be enhanced.

The mutual inductance M between an inductor or a transformer winding $L_m$ of an energy-storage magnetic component in a power converter (such as a flyback converter or a boost circuit) and an EMI filter inductor L in an EMI differential-mode filter is expressed as follows:

$$M = K\sqrt{L \cdot L_m}.$$

Here, K is a coupling coefficient between the inductor or transformer winding $L_m$ of the energy-storage magnetic component in the power converter (such as a flyback converter or a boost circuit) and the EMI filter inductor L in the EMI differential-mode filter, L is the inductance of the EMI filter inductor (as described above, the signal L represents not only the EMI filter inductor itself but also the algebra character of the inductance value of the EMI filter inductor), and $L_m$ is the inductance of the inductor or transformer winding $L_m$ of the energy-storage magnetic component in the power converter (such as a flyback converter or a boost circuit).

The regulation of M may be realized by regulating any of parameters K, L and $L_m$.

For an inductor or a transformer winding of an energy-storage magnetic component in a power converter (such as a flyback converter or a boost circuit) and an EMI filter inductor in an EMI differential-mode filter, the inductance L or $L_m$ thereof may be regulated by regulating the turns of their winding and/or changing the permeability of a magnetic material U used in them.

However, the coupling coefficient K will be affected by the relative location between an energy-storage magnetic component in a power converter (such as a flyback converter or a boost circuit) and an EMI filter inductor in an EMI differential-mode filter, wherein $$K \propto \frac{1}{D^\alpha}$$

Figure 8:
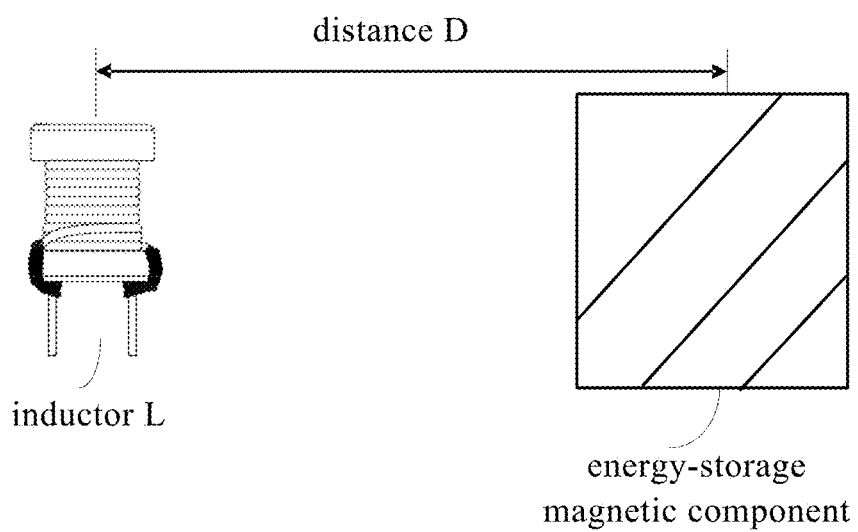
FIG. 8 illustratively shows an embodiment that the coupling coefficient K of the mutual inductance between inductor L in an EMI differential-mode filter and an energy-storage magnetic component in a power conversion apparatus is affected by the distance D.

In the above equation, D is a distance between an energy-storage magnetic component in a power converter (such as a flyback converter or a boost circuit) and an EMI filter inductor in an EMI differential-mode filter, α is α constant and $2<\alpha<3$. FIG. 8 illustratively shows an embodiment that the coupling coefficient K of the mutual inductance between an inductor L in an EMI differential-mode filter and an energy-storage magnetic component in a power conversion apparatus is affected by the distance D.

Figure 9A:
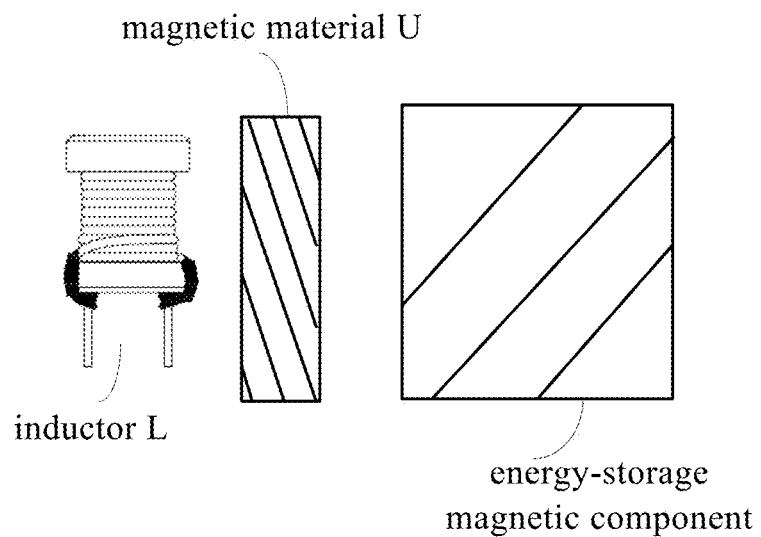
FIG. 9A illustratively shows an embodiment that the coupling coefficient K of the mutual inductance between an inductor L in an EMI differential-mode filter and an energy-storage magnetic component in a power conversion apparatus is affected by a magnetic material U therebetween.

A magnetic material U may be arranged between an energy-storage magnetic component in a power converter (such as a flyback converter or a boost circuit) and an EMI filter inductor L in an EMI differential-mode filter to change the coupling coefficient K, and the coupling coefficient K may be regulated by changing the location of the added magnetic material U. FIG. 9A illustratively shows an embodiment that the coupling coefficient K of the mutual inductance between an inductor L in an EMI differential-mode filter and an energy-storage magnetic component in the power conversion apparatus is affected by a magnetic material U therebetween.

Figure 9B:
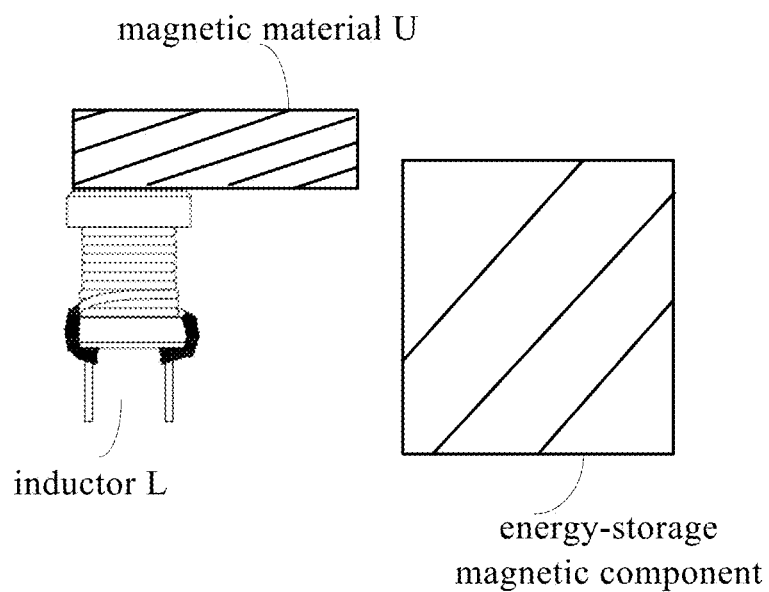
FIG. 9B illustratively shows an embodiment that the magnetic material U between an inductor L in an EMI differential-mode filter and an energy-storage magnetic component in a power conversion apparatus may be integrally formed with the inductor L in the EMI differential-mode filter.

The magnetic material U may be integrally formed with the EMI filter inductor L in the EMI differential-mode filter, and FIG. 9B illustratively shows an embodiment that the magnetic material U between an inductor L in an EMI differential-mode filter and an energy-storage magnetic component in the power conversion apparatus may be integrally formed with the inductor L in the EMI differential-mode filter.

Figure 9C:
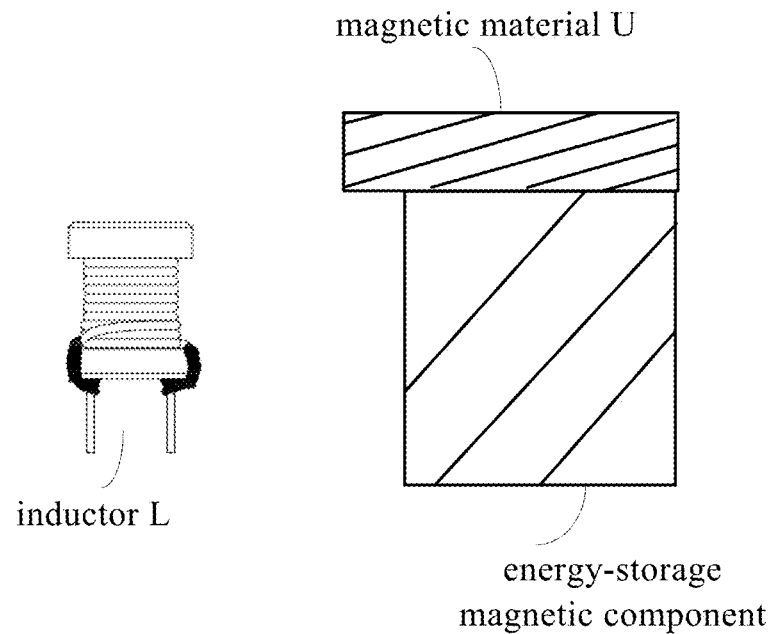
FIG. 9C illustratively shows an embodiment that the magnetic material U between an inductor L in an EMI differential-mode filter and an energy-storage magnetic component in a power conversion apparatus may be integrally formed with the energy-storage magnetic component in the power conversion apparatus.

The magnetic material U may be integrally formed with the energy-storage magnetic component in the power converter (such as a flyback converter or a boost circuit), and FIG. 9C illustratively shows an embodiment that the magnetic material U between an inductor L in an EMI differential-mode filter and an energy-storage magnetic component in the power conversion apparatus may be integrally formed with the energy-storage magnetic component in the power conversion apparatus.

Figure 9D:
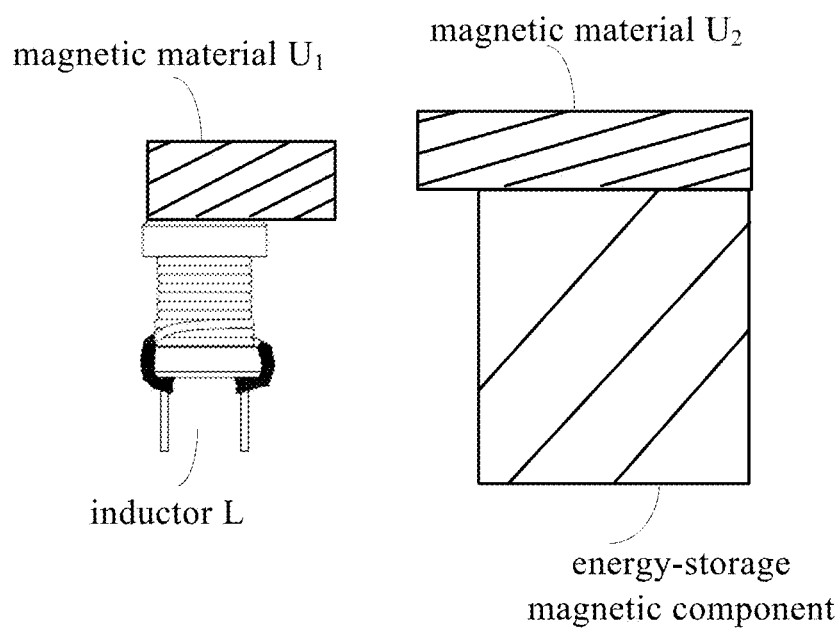
FIG. 9D illustratively shows an embodiment that the magnetic material $U_1$ and $U_2$ arranged between an inductor L in an EMI differential-mode filter and an energy-storage magnetic component in a power conversion apparatus may be integrally formed with the EMI filter inductor L in the EMI differential-mode filter and the energy-storage magnetic component in the power conversion apparatus, respectively.

A magnetic material $U_1$ may be integrally formed with an EMI filter inductor L in an EMI differential-mode filter while a magnetic material $U_2$ may be integrally formed with an energy-storage magnetic component in a power converter (such as a flyback converter or a boost circuit), and the magnetic material $U_1$ and the magnetic material $U_2$ may be of the same material or different from each other. FIG. 9D illustratively shows an embodiment that the magnetic material $U_1$ and $U_2$ arranged between an inductor L in an EMI differential-mode filter and an energy-storage magnetic component in the power conversion apparatus may be integrally formed with the EMI filter inductor L in the EMI differential-mode filter and the energy-storage magnetic component in the power conversion apparatus, respectively.

Figure 10:
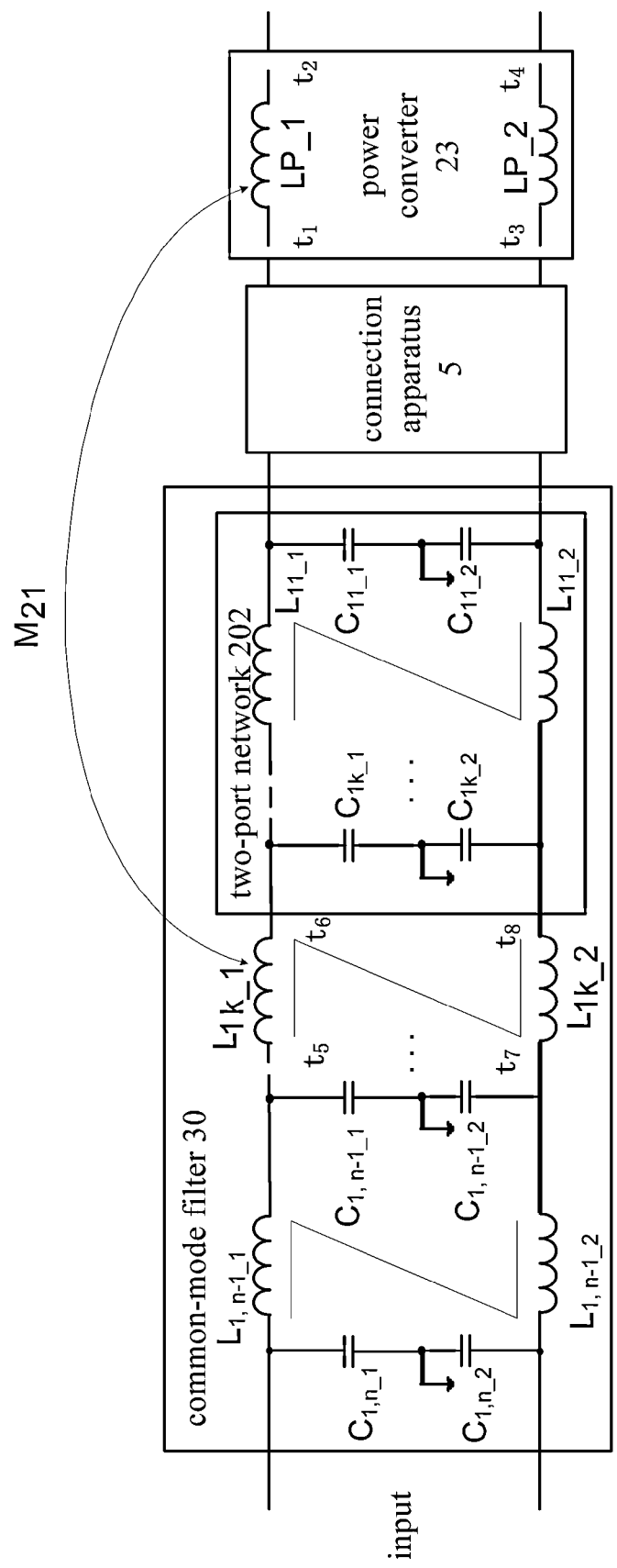
FIG. 10 is a circuit diagram illustratively showing an embodiment of the power conversion apparatus comprising a $(2 \times (n-1)+1)$-order EMI common-mode filter and a power converter.

FIG. 10 is a circuit diagram illustratively showing an embodiment of a power conversion apparatus comprising a $(2 \times (n-1)+1)$-order EMI common-mode filter and a power converter. FIG. 10 is a partially concretized diagram of FIG. 1B.

The power conversion apparatus in FIG. 10 comprises a power converter 23 and an EMI common-mode filter 30. The EMI common-mode filter 30 is connected between an input and the power converter 23, and for example, may be a $(2 \times (n-1)+1)$-order common-mode filter or a $(2 \times n)$-order common-mode filter, where n is an arbitrary integer and n>0, and k is an integer and $0<k\le n$.

The power converter 23 in FIG. 10 includes an energy-storage magnetic component for converting energy in the form of inductance winding. The power converter 23 may be a converter in any form, for example, an Alternate Current (AC)-Direct Current (DC) converter, a DC-DC converter, a DC-AC converter, an isolation converter, or a non-isolation converter.

The input in FIG. 10 may be a Direct Current input or may also be an Alternate Current input.

As an embodiment of the present application, other connection apparatus 5, such as an impedance network in any form, and so on, may be arranged between the EMI common-mode filter 30 and the power converter 23.

Since any inductor and any transformer used in practical operation are not ideal, magnetic flux leakage and mutual inductance phenomena may arise between inductors or transformers. With reference to the processing of an EMI signal in FIGS. 1A-9D, those skilled in the art should completely understand the processing of an EMI signal in the form of common-mode in FIG. 10. For example, a mutual inductance $M_{21}$ may arise between the EMI common-mode filter inductors $L_{1\_k\_1}$ and $L_{1\_k\_2}$ in the (2×(n−1)+1)-order EMI common-mode filter 30 and the inductors or transformer windings LP_1 and LP_2 of the energy-storage magnetic component in the power converter 23, and thus the inductors or transformer windings LP_1 and LP_2 of the energy-storage magnetic component in the power converter 23 may influence the EMI common-mode filter 30. If such influence is not controlled, the normal operation of the EMI common-mode filter 30 would be affected, or the performance and effect of the EMI common-mode filter 30 are reduced. On the contrary, the present application positively utilizes such influence to improve the performance and effect of the EMI common-mode filter 30.

In order to facilitate the description of the present application, a network comprising filter capacitors and filter inductors, which are located between the EMI common-mode filter inductors $L_{1\_k\_1}$ and $L_{1\_k\_2}$ and the inductors or transformer windings LP_1 and LP_2 of the energy-storage magnetic component of the power converter 23, may be equaled to a two-port network 202.

It should be noted that, the EMI filter in FIG. 10 is an EMI common-mode filter 30, and the power converter 23 comprises inductors or transformer windings LP_1 and LP_2 of the energy-storage magnetic component, which form and provide a common-mode magnetic path. For example, a magnetic coupling may arise between the EMI common-mode filter inductors $L_{1\_k\_1}$ and $L_{1\_k\_2}$ in the EMI common-mode filter 30 and the inductors or transformer windings LP_1 and LP_2 of the energy-storage magnetic component. The symbols t1, t2, t3, t4, t5, t6, t7 and t8 represent the lead ends of respective inductors or windings (that is, the inductors or transformer windings LP_1 and LP_2 of the energy-storage magnetic component, and the EMI common-mode filter inductors $L_{1\_k\_1}$ and $L_{1\_k\_2}$ in the EMI common-mode filter 30), as shown in FIG. 10.

A coupling manner between the inductors or transformer windings LP_1 and LP_2 of the energy-storage magnetic component in the power converter 23 and the EMI common-mode filter inductors $L_{1\_k\_1}$ and $L_{1\_k\_2}$ in the EMI common-mode filter 30 may be regulated such that a series resonance is formed by a two-port network 202 and a mutual inductance (that is, mutual inductance $M_{21}$) formed between the inductors or transformer windings LP_1 and LP_2 of the energy-storage magnetic component and the EMI common-mode filter inductors $L_{1\_k\_1}$ and $L_{1\_k\_2}$, and the resonant frequency f is regulated such that the ratio of the resonant frequency f to the frequency f0 at which insertion loss of the EMI common-mode filter 30 needs to be improved, is appropriately 1, and may be 85%~115% in practice (that is, in consideration of ±15% error). Therefore, the EMI common-mode filter 30 may obtain more insertion loss in comparison with a conventional EMI common-mode filter at the frequency f0, and the performance and effect of the EMI common-mode filter 30 may be enhanced.

Although the present application has been described by an example of the (2×(n−1)+1)-order EMI common-mode filter in FIG. 10, those skilled in the art should completely understand an implement of a (2×n)-order EMI common-mode filter.

According to the embodiment of FIG. 10, the interference with the EMI common-mode filter from the energy-storage magnetic component in the power converter may be reduced, the performance and effect of the EMI common-mode filter may be enhanced, and the insertion loss of the EMI common-mode filter against common-mode electromagnetic interference at specific frequencies may be further improved, thereby the increased volume and cost of the EMI common-mode filter can be avoidable.

Figure 11A:
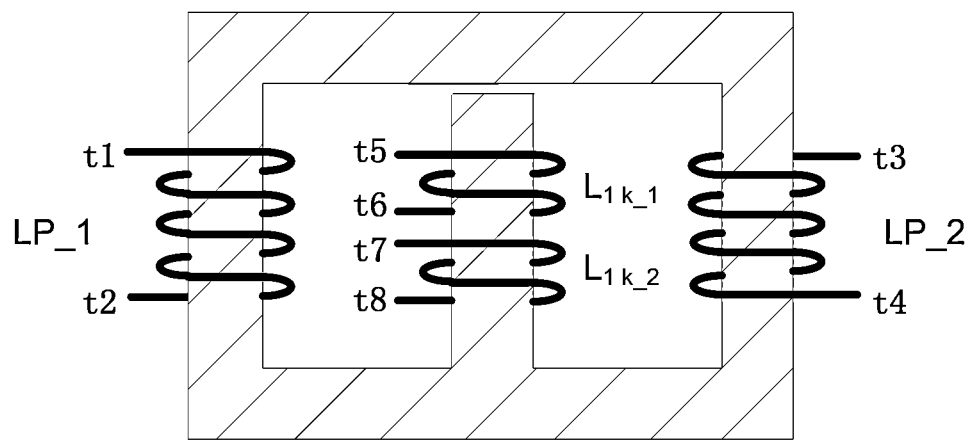
FIG. 11A illustratively shows an embodiment that a negative coupling may arise between the inductors or transformer windings LP_1 and LP_2 of the energy-storage magnetic component in the power converter and the EMI common-mode filter inductors $L_{1\_k\_1}$ and $L_{1\_k\_2}$ in the EMI common-mode filter 30 in FIG. 10.

FIG. 11A illustratively show an embodiment that a negative coupling may arise between the inductors or transformer windings LP_1 and LP_2 of the energy-storage magnetic component of the power converter and the EMI common-mode filter inductors $L_{1\_k\_1}$ and $L_{1\_k\_2}$ of the EMI common-mode filter 30 in FIG. 10. As shown in FIG. 11A, the coupling core is an EI-type magnetic core which is formed of an E-type magnetic core and an I-type magnetic core. The inductors or transformer windings LP_1 and LP_2 of the energy-storage magnetic component in the power converter 23 are respectively wrapped around the side pillars of the E-type magnetic core, so as to form and provide a common-mode magnetic path in the centre pillar of the E-type magnetic core. The windings of the EMI common-mode filter inductors $L_{1\_k\_1}$ and $L_{1\_k\_2}$ of the EMI common-mode filter 30 are wrapped around the centre pillar of the E-type magnetic core, so as to magnetically couple with the inductors or transformer windings LP_1 and LP_2 of the energy-storage magnetic component in the power converter 23 to form a coupling mutual inductance $M_{21}$. With reference to the indication by the lead ends t1, t2, t3, t4, t5, t6, t7 and t8 of the inductors or windings shown in FIG. 10, it should be understood that, a coupling manner between the inductors or transformer windings LP_1 and LP_2 of the energy-storage magnetic component of the power converter and the EMI common-mode filter inductors $L_{1\_k\_1}$ and $L_{1\_k\_2}$ of the EMI common-mode filter 30 may be set to a negative coupling. With reference to the description of FIGS. 1A to 10, a series resonance may be formed by the coupling mutual inductance $M_{21}$ and the two-port network 202 when the equivalent parallel branch of the two-port network 202 between the inductors or transformer windings LP_1 and LP_2 of the energy-storage magnetic component of the power converter 23 and the EMI common-mode filter inductors $L_{1\_k\_1}$ and $L_{1\_k\_2}$ of the EMI common-mode filter 30 presents capacitive.

Similar to the differential-mode filter, the resonant frequency f of the series resonance equivalent to a two-port network in a common-mode filter may be generalized as follows:

$$f = \frac{B}{2\pi M}$$

Here, B is an imaginary part value of impedance $Z_2$ of a parallel branch equivalent to the two-port network in FIG. 3(c). M is a mutual inductance value between an energy-storage magnetic component in a power converter and an inductor component in a filter.

When the sign of B is negative, the coupling manner between the energy-storage magnetic component in the power converter and the inductor component in the filter is regulated to a negative coupling.

When the sign of B is positive, the coupling manner between the energy-storage magnetic component in the power converter and the inductor component in the filter is regulated to a positive coupling.

Since a multi-order two-port network at least comprises a capacitor, the imaginary part value (i.e. B) of the impedance of a parallel branch equivalent to a two-port network can be regulated by regulating the capacitance of the capacitor, so as to achieve the regulation of the resonant frequency. As for a two-port network further comprising at least an inductor, an imaginary part value (i.e. B) of the impedance of a parallel branch equivalent to a two-port network can also be regulated by regulating the inductance of the inductor, so as to achieve the regulation of the resonant frequency. Alternately, an imaginary part vale (i.e. B) of the impedance of a parallel branch equivalent to a two-port network can be regulated by regulating both the capacitance of a capacitor and the inductance of an inductor simultaneously, so as to achieve the regulation of the resonant frequency. Further, the inductance value of an energy-storage magnetic component in a power converter and common-mode filter inductors in an EMI common-mode filter can be regulated by regulating the turns of windings thereof, so as to achieve the regulation of the resonant frequency.

For a common-mode filter, the coupling manner may be regulated, for example by regulating the winding mode of the EMI common-mode filter inductors $L_{1\_k\_1}$ and $L_{1\_k\_2}$ of the EMI common-mode filter 30. All or a part of windings of the EMI common-mode filter inductors $L_{1\_k\_1}$ and $L_{1\_k\_2}$ of the EMI common-mode filter 30 may be wrapped around the centre pillar of an E-type magnetic core. The coupling mutual inductance $M_{21}$ may be regulated by regulating the turns of the EMI common-mode filter inductors $L_{1\_k\_1}$ and $L_{1\_k\_2}$ of the EMI common-mode filter 30 being wrapped around the centre pillar of the E-type magnetic core, or by regulating a gap between the centre pillar of E-type magnetic core and I-type magnetic core (that is, regulating the common-mode magnetic flux in the centre pillar of the E-type magnetic core).

Figure 11B:
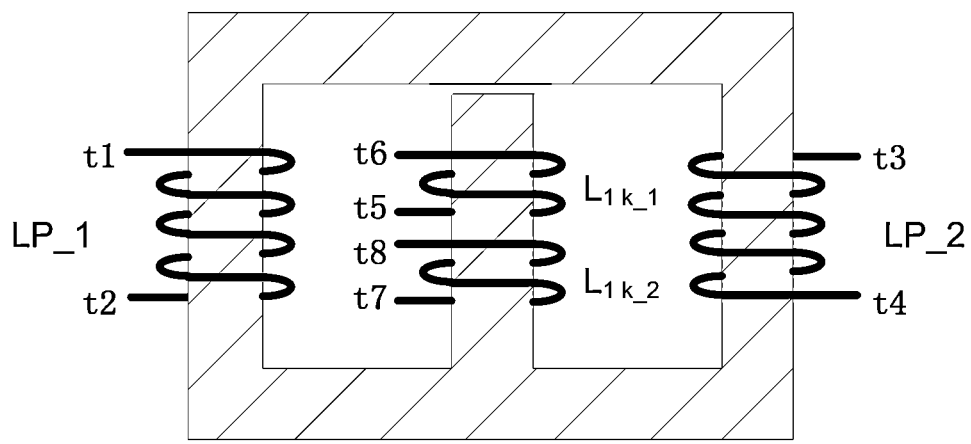
FIG. 11B illustratively shows an embodiment that a positive coupling may arise between the inductors or transformer windings LP_1 and LP_2 of the energy-storage magnetic component in the power converter and the EMI common-mode filter inductors $L_{1\_k\_1}$ and $L_{1\_k\_2}$ in the EMI common-mode filter 30 in FIG. 10.

FIG. 11B illustratively shows an embodiment that a positive coupling may arise between the inductors or transformer windings LP_1 and LP_2 of the energy-storage magnetic component of the power converter and the EMI common-mode filter inductors $L_{1\_k\_1}$ and $L_{1\_k\_2}$ of the EMI common-mode filter 30 in FIG. 10. The difference between FIG. 11B and FIG. 11A lies in that, the wrapping direction of the winding of the EMI common-mode filter inductors $L_{1\_k\_1}$ and $L_{1\_k\_2}$ of the EMI common-mode filter 30 being wrapped around the center pillar of the E-type magnetic core in FIG. 11B is contrary to that in FIG. 11A. With reference to the indication by the lead ends t1, t2, t3, t4, t5, t6, t7 and t8 of the inductors or windings shown in FIG. 10, it should be understood that, in FIG. 11B, a positive coupling may arise between the inductors or transformer windings LP_1 and LP_2 of the energy-storage magnetic component of the power converter and the EMI common-mode filter inductors $L_{1\_k\_1}$ and $L_{1\_k\_2}$ of the EMI common-mode filter 30, which is adaptive for a case that the two-port network 202 in FIG. 10 presents inductive.

Figure 12A:
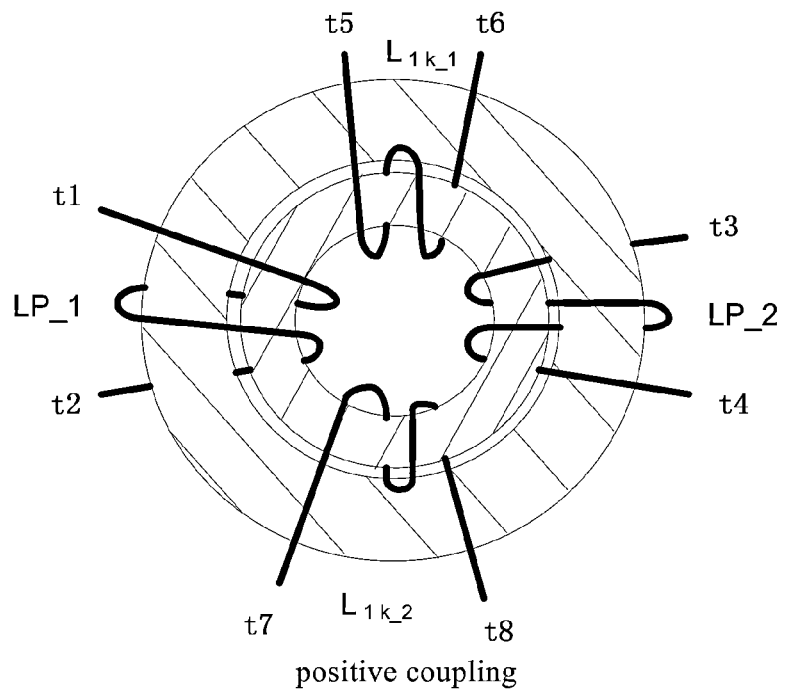
FIG. 12A illustratively shows another embodiment that a positive coupling may arise between the inductors or transformer windings LP_1 and LP_2 of the energy-storage magnetic component in the power converter and the EMI common-mode filter inductors $L_{1\_k\_1}$ and $L_{1\_k\_2}$ in the EMI common-mode filter 30 in FIG. 10.
Figure 12B:
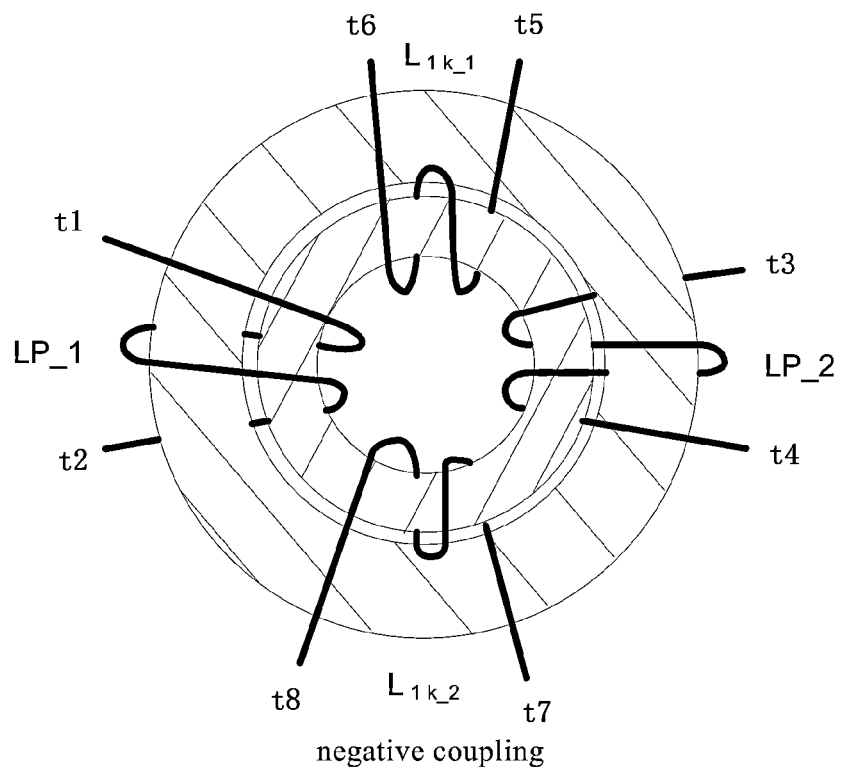
FIG. 12B illustratively shows another embodiment that a negative coupling may arise between the inductors or transformer windings LP_1 and LP_2 of the energy-storage magnetic component in the power converter and the EMI common-mode filter inductors $L_{1\_k\_1}$ and $L_{1\_k\_2}$ in the EMI common-mode filter 30 in FIG. 10.

FIG. 12A illustratively shows another embodiment that a positive coupling may arise between the inductors or transformer windings LP_1 and LP_2 of the energy-storage magnetic component of the power converter and the EMI common-mode filter inductors $L_{1\_k\_1}$ and $L_{1\_k\_2}$ of the EMI common-mode filter 30 in FIG. 10. FIG. 12B illustratively shows another embodiment that a negative coupling may arise between the inductors or transformer windings LP_1 and LP_2 of the energy-storage magnetic component of the power converter and the EMI common-mode filter inductors $L_{1\_k\_1}$ and $L_{1\_k\_2}$ of the EMI common-mode filter 30 in FIG. 10. FIG. 12A and FIG. 12B illustrate a case that a coupling magnetic core is a circular magnetic core.

The inductors or transformer windings LP_1 and LP_2 of the energy-storage magnetic component of the power converter in FIG. 12A and FIG. 12B are wrapped around two circular magnetic cores, so as to integrate functions of differential-mode filtering and common-mode filtering.

With reference to the indication by the lead ends t1, t2, t3, t4, t5, t6, t7 and t8 of the inductors or windings shown in FIG. 10, it should be understood that, the inductors or transformer windings LP_1 and LP_2 of the energy-storage magnetic component of the power converter in FIG. 12A and FIG. 12B may form a differential-mode magnetic path at the bigger circular magnetic core, for the purpose of filtering differential-mode signals, and the inductors or transformer windings LP_1 and LP_2 of the energy-storage magnetic component of the power converter in FIG. 12A and FIG. 12B may form a common-mode magnetic path at the smaller circular magnetic core, for the purpose of filtering a common-mode signal.

The EMI common-mode filter inductors $L_{1\_k\_1}$ and $L_{1\_k\_2}$ of the EMI common-mode filter 30 in FIG. 12A and FIG. 12B may be wrapped around the smaller magnetic core, so as to inductively couple with the inductors or transformer windings LP_1 and LP_2 of the energy-storage magnetic component of the power converter 23 to form a coupling inductance. With reference to the indication by the lead ends t1, t2, t3, t4, t5, t6, t7 and t8 of the inductors or windings shown in FIG. 10, it should be understood that, in FIG. 12A, a positive coupling may arise between the inductors or transformer windings LP_1 and LP_2 of the energy-storage magnetic component of the power converter and the EMI common-mode filter inductors $L_{1\_k\_1}$ and $L_{1\_k\_2}$ of the EMI common-mode filter 30. In FIG. 12B, a negative coupling may arise between the inductors or transformer windings LP_1 and LP_2 of the energy-storage magnetic component of the power converter and the EMI common-mode filter inductors $L_{1\_k\_1}$ and $L_{1\_k\_2}$ of the EMI common-mode filter 30. With reference to the description of FIGS. 1A to 11B, it should be understood that, a series resonance may be properly formed by the coupling inductance and a two-port network 202 which is connected between the inductors or transformer windings LP_1 and LP_2 of the energy-storage magnetic component of the power converter 23 and the EMI common-mode filter inductors $L_{1\_k\_1}$ and $L_{1\_k\_2}$ of the EMI common-mode filter 30.

The coupling manner may be regulated by regulating the winding mode of the EMI common-mode filter inductors $L_{1\_k\_1}$ and $L_{1\_k\_2}$ of the EMI common-mode filter 30. All or a part of the windings of the EMI common-mode filter inductors $L_{1\_k\_1}$ and $L_{1\_k\_2}$ of the EMI common-mode filter 30 may be wrapped around the smaller circular magnetic core. The coupling mutual inductance may be regulated by regulating the turns of the EMI common-mode filter inductors $L_{1\_k\_1}$ and $L_{1\_k\_2}$ of the EMI common-mode filter 30 being wrapped around the smaller circular magnetic core.

It should be noted that the bigger magnetic core and the smaller magnetic core in FIGS. 12A and 12B are only used to differentiate two different magnetic cores, and the actual capacity, volume or magnetic permeability of the two magnetic cores may be determined as needed.

According to the present application, the interference with an EMI filter from an energy-storage magnetic component in an power converter may be reduced, the performance and effect of the EMI filter may be enhanced, and the insertion loss of the EMI filter against electromagnetic interference at specific frequencies may be further improved, thereby the increased volume and cost of the EMI filter may be avoided while improving the insertion loss at specific frequencies.

While the application has been described in connection with typical embodiments, it will be understood that the terminology used herein is illustrative and exemplary, and is not intended as limiting. Since the present application may be implemented in various forms without departing the concept and spirit of the present application, the embodiments mentioned above are not limited to the details set forth herein, and should be contemplated broadly according to the concept and spirit defined by the claims. Therefore, the claims intend to cover all modifications and variations which fall within the following claims and equivalents thereto.

What is claimed is:

1. A power conversion apparatus, comprising:
a power converter, comprising an energy-storage magnetic component; and
a filter, comprising an inductor component and a two-port network connected between the energy-storage magnetic component and the inductor component,
wherein a series resonance is formed by the two-port network and a mutual inductance which is formed by a coupling between the energy-storage magnetic component and the inductor component, and a resonant frequency of the series resonance is 85%~115% of a frequency at which insertion loss of the filter needs to be improved.

2. The power conversion apparatus according to claim 1, wherein a parallel branch equivalent to the two-port network presents capacitive, and a coupling manner between the energy-storage magnetic and the inductor component is regulated to a negative coupling.

3. The power conversion apparatus according to claim 1, wherein a parallel branch equivalent to the two-port network presents inductive, and a coupling manner between the energy-storage magnetic and the inductor component is regulated to a positive coupling.

4. The power conversion apparatus according to claim 1, wherein
the two-port network comprises at least a capacitor, and the resonant frequency of the series resonance is regulated by regulating the capacitor.

5. The power conversion apparatus according to claim 1, wherein
the resonant frequency of the series resonance is regulated by regulating the mutual inductance.

6. The power conversion apparatus according to claim 5, wherein
the mutual inductance is regulated by regulating at least one of a value of the inductor component and a value of the energy-storage magnetic component.

7. The power conversion apparatus according to claim 5, wherein
the mutual inductance is regulated by regulating a coupling coefficient between the inductor component and the energy-storage magnetic component.

8. The power conversion apparatus according to claim 7, wherein
the filter is a differential-mode filter, and the coupling coefficient is regulated by regulating a relative position between the inductor component and the energy-storage magnetic component.

9. The power conversion apparatus according to claim 7, wherein
the filter is a differential-mode filter, and the coupling coefficient is regulated by providing a magnetic material between the inductor component and the energy-storage magnetic component.

10. The power conversion apparatus according to claim 7, wherein
the filter is a differential-mode filter, and the coupling coefficient is regulated by providing a magnetic material on the inductor component, which is integrally formed with the inductor component.

11. The power conversion apparatus according to claim 7, wherein
the filter is a differential-mode filter, and the coupling coefficient is regulated by providing a magnetic material on the energy-storage magnetic component, which is integrally formed with the energy-storage magnetic component.

12. The power conversion apparatus according to claim 1, wherein
the filter is a common-mode filter, and the energy-storage magnetic component provides a common-mode magnetic path.

13. The power conversion apparatus according to claim 1, wherein
the frequency, at which insertion loss of the filter needs to be improved, is an integral multiple of a switch frequency of the power converter.

14. The power conversion apparatus according to claim 1, wherein
the energy-storage magnetic component is an inductor component or a transformer.

15. The power conversion apparatus according to claim 1, wherein
the two-port network is a capacitor.

16. A method for improving a performance of a filter, comprising:
providing an energy-storage magnetic component which is arranged in a power converter;
providing the filter including an inductor component and a two-port network connected between the energy-storage magnetic component and the inductor component;
determining a frequency at which insertion loss of the filter needs to be improved; and
regulating a coupling manner between the energy-storage magnetic component and the inductor component, such that a series resonance is formed by the two-port network and a mutual inductance formed by a coupling between the energy-storage magnetic component and the inductor component, and regulating a resonant frequency of the series resonance to 85%~115% of a frequency at which insertion loss of the filter needs to be improved.

17. The method according to claim 16, wherein
when a parallel branch equivalent to the two-port network presents capacitive, the coupling manner between the energy-storage magnetic component and the inductor component is regulated to a negative coupling, when the parallel branch equivalent to the two-port network presents inductive, the coupling manner between the energy-storage magnetic and the inductor component is regulated to a positive coupling.

18. The method according to claim 16, wherein
the resonant frequency is regulated by regulating at least a capacitor in the two-port network.

19. The method according to claim 16, wherein
the resonant frequency is regulated by regulating the mutual inductance.

20. The method according to claim 19, wherein
the mutual inductance is regulated by regulating at least one of a value of the inductor component and a value of the energy-storage magnetic component.

21. The method according to claim 19, wherein
the mutual inductance is regulated by regulating a coupling coefficient between the inductor component and the energy-storage magnetic component.

22. The method according to claim 16, wherein
the filter is a common-mode filter, and the energy-storage magnetic component provides a common-mode magnetic path.
23. The method according to claim 16, wherein
the frequency, at which insertion loss of the filter needs to be improved, is an integral multiple of a switch frequency of the power converter.
24. The method according to claim 16, wherein
the energy-storage magnetic component is an inductor component or a transformer.
25. The method according to claim 16, wherein
the two-port network is a capacitor.

\* \* \* \* \*